US011004128B1

(12) United States Patent
Mishra

(10) Patent No.: US 11,004,128 B1
(45) Date of Patent: May 11, 2021

(54) AUTOMATICALLY DESIGNING CUSTOMIZED GARMENTS BASED ON CUSTOMER BEHAVIOR

(71) Applicant: Amazon Technologies, Inc., Seattle, WA (US)

(72) Inventor: Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 680 days.

(21) Appl. No.: 15/603,159

(22) Filed: May 23, 2017

(51) Int. Cl.
  *G06Q 30/00* (2012.01)
  *G06Q 30/06* (2012.01)

(52) U.S. Cl.
  CPC ..... *G06Q 30/0621* (2013.01); *G06Q 30/0631* (2013.01); *G06Q 30/0633* (2013.01); *G06Q 30/0643* (2013.01)

(58) Field of Classification Search
  CPC .......... G06Q 30/0621; G06Q 30/0631; G06Q 30/0633; G06Q 30/0643
  USPC ...................................................... 705/26, 27
  See application file for complete search history.

(56) References Cited

U.S. PATENT DOCUMENTS

| | | | |
|---|---|---|---|
| 9,773,274 B2 * | 9/2017 | Curry | G06T 13/40 |
| 10,035,643 B2 | 7/2018 | Holman et al. | |
| 2009/0075242 A1 | 3/2009 | Schwarzberg et al. | |
| 2011/0307420 A1 * | 12/2011 | Shaw | A41D 27/08 |
| | | | 705/500 |
| 2012/0109777 A1 * | 5/2012 | Lipsitz | G06Q 30/06 |
| | | | 705/26.5 |
| 2012/0285986 A1 | 11/2012 | Irvin | |
| 2014/0032359 A1 * | 1/2014 | Dewangan | G06Q 30/0631 |
| | | | 705/26.7 |
| 2015/0154691 A1 * | 6/2015 | Curry | G06F 30/23 |
| | | | 705/27.2 |
| 2015/0363860 A1 | 12/2015 | Lantrip et al. | |
| 2016/0117752 A1 * | 4/2016 | Chacko | G06Q 30/0631 |
| | | | 705/26.7 |
| 2017/0193586 A1 | 7/2017 | Yuan et al. | |

(Continued)

FOREIGN PATENT DOCUMENTS

WO    2007110788 A2    10/2007

OTHER PUBLICATIONS

"RichRelevance and Zugara Introduce Fashionista[TM], A New Online Shopping Experience for Apparel." Business Wire Nov. 16, 2009: Dialog #212098027; 3pgs. (Year: 2009).*

*Primary Examiner* — Robert M Pond
(74) *Attorney, Agent, or Firm* — Athorus, PLLC

(57) ABSTRACT

Products such as food, clothing or machines may be customized for a customer based on any preferences that may be determined from information that is known, determined or predicted regarding the customer. Where a customer's browsing, purchasing or search histories, or other data, indicate that the customer prefers (or dislikes) products having a specific ingredient or component, a product may be customized to include (or exclude) the ingredient or component, and recommended to the customer. Customized products may include food, clothing, machines or any other articles that may be fabricated with or altered to include specific components. A customized product may be marketed to a customer in any manner, and may be prepared and delivered to the customer upon request.

20 Claims, 21 Drawing Sheets

(56) References Cited

U.S. PATENT DOCUMENTS

2017/0220558 A1    8/2017   Pinel et al.
2017/0344950 A1    11/2017   Dhagumudi et al.

\* cited by examiner

GASTRONOMIC PROFILES

CALHOUN, OLIVER

ORDER HISTORY 114-2

| Date | Food Product | Cost | Size | Main Ingredients | | | |
|---|---|---|---|---|---|---|---|
| 04/07/2014 | Benedictine Spread, Lexington, Ky. | $11.99 | 1 quart | English cucumbers (2) | Minced white onion (2 tsp) | Cream cheese (8 oz) | Dill (1/2 tsp) | Hot sauce (1/4 tsp) |
| 04/05/2014 | Florida Oranges | $33.99 | 1 bushel | Oranges | | | | |
| 03/30/2014 | Italian Bread, Lansing, Mich. | $7.99 | 19.5 oz. | Dry yeast (1/4 oz.) | Warm water (2 c.) | Sugar (1 tsp) | Salt (2 tsp) | Gluten-free flour (5 1/2 c.) |
| 03/28/2014 | Corn Bread (mixture), Ames, Iowa | $3.99 | 8.5 oz. | Butter (2/3 c.) | Sugar (1 c.) | Eggs (3) | Corn meal (1 c.) | Gluten-free flour (2 1/3 c.) |
| 03/22/2014 | Lasagna, Philadelphia | $7.95 | 24 oz. | Gluten-free pasta (8 oz.) | Ground beef (8 oz.) | Onion (1 sm., diced) | Tomato sauce (8 oz.) | Garlic (2 cloves, minced) |
| 03/20/2014 | Linguine, Hartford | $2.00 | 14 oz. | Gluten-free linguine (8 oz.) | Minced claims (6.5 oz.) | Butter (1/4 c.) | Olive oil (1/2 c.) | Garlic (1.5 cloves, sliced) |

ALLERGENS
- NO GLUTEN
- DAIRY OK

TASTES
- MILD
- SWEETS

FAT
- UNSATURATED: LOW
- SATURATED: MEDIUM

CARBOHYDRATES
- NO GLUTEN

Browser — File Edit View History Bookmarks
URL: http://market.place.com/

Market Place — Welcome Ollie! 🛒 (0)
Search: sourdough — OK

APR 24 — Today's Deals

- Butter
  Olive oil & salt
  90 cal / tbsp.
  $4.75

- Margarine
  No saturated fat
  < 0.5 g fat / serving
  $3.50

RECOMMENDED JUST FOR YOU
Sourdough Round

Gluten Free
Extra Sweet
Savory

Mixture Only $4.99 — [1-hour]
Bake & Deliver $10.99 — [2-hour]

Customers who searched for "Sourdough Bread" also purchased:

Sourdough Bread Mix $12.99 ★★★★☆
San Francisco California Wheat
[Add to Cart]

"BEST SOURDOUGHS" ★★★★☆
$14.99
ELECTRONIC/PAPERBACK
© 1999 77 PAGES

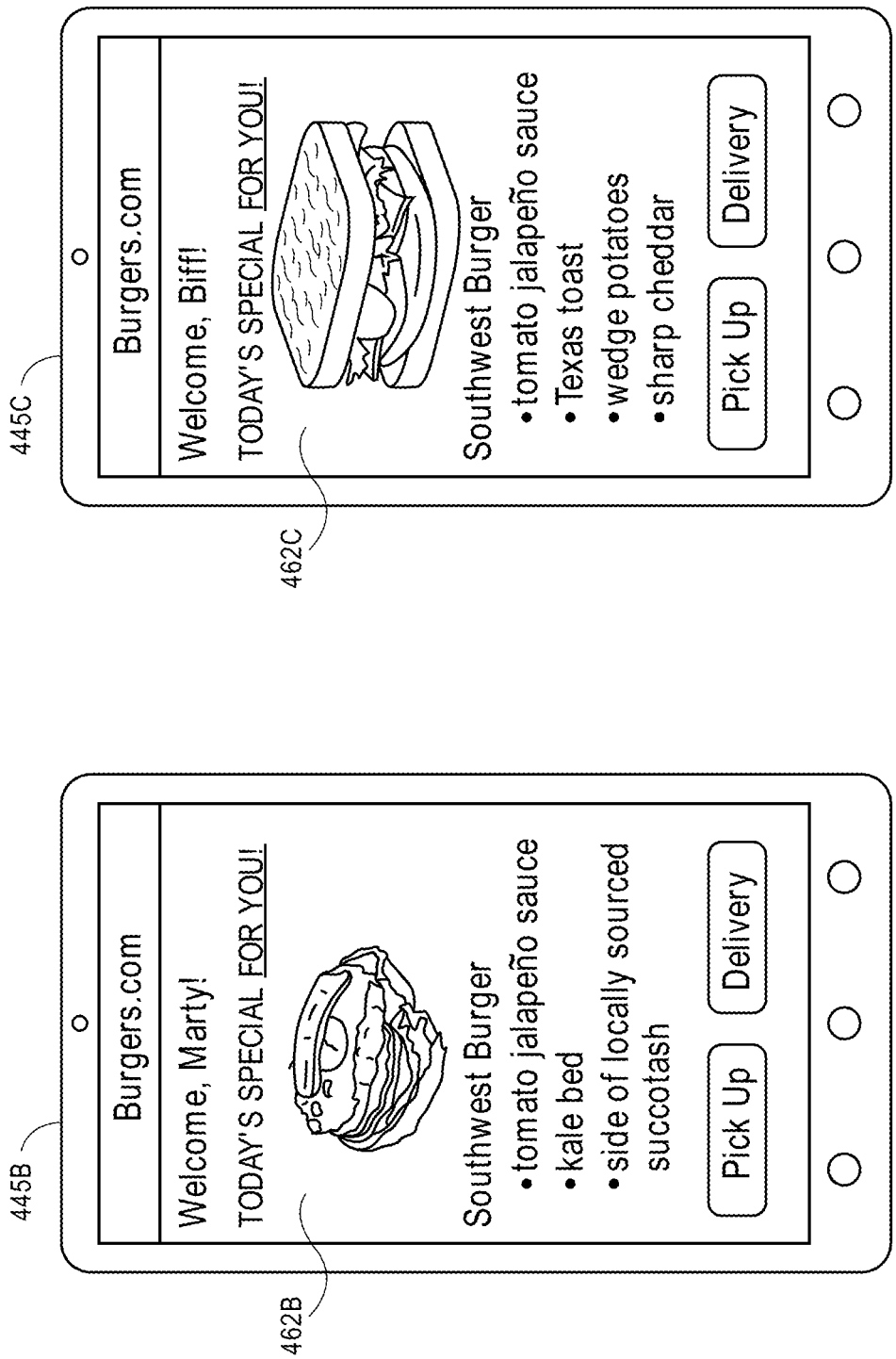

714

| INGREDIENT | LAST 12 MO (g) | AVE (g/mo) | PEAK (g/mo) | MIN (g/mo) |
|---|---|---|---|---|
| Milk Chocolate | 8042 | 670.17 | 1641 | 104 |
| Dark Chocolate | 5444 | 453.67 | 850 | 25 |
| Cereal (wheat) | 11219 | 934.92 | 1354 | 454 |
| Raisins (plain) | 1648 | 137.33 | 256 | 114 |
| Cheese Crackers | 4750 | 395.83 | 554 | 227 |
| Fruit Cups | 16976 | 1414.67 | 1362 | 340 |
| Sunflower Oil | 9948 | 829.00 | 1250 | 0 |
| Sunflower Seeds | 9254 | 771.17 | 951 | 125 |
| Chick Peas | 10132 | 844.33 | 984 | 454 |
| Soybeans | 9896 | 824.67 | 975 | 375 |
| Pretzels | 4942 | 411.83 | 454 | 399 |
| Peanuts | 0 | 0 | 0 | 0 |
| Peanut Butter | 0 | 0 | 0 | 0 |

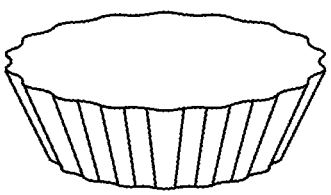

768

To: Benny
From: chocolate@nut.free.com
Subject: Nut Free Cups for Halloween
Date: 10/20/2017 5:30pm Soy Nut Butter Cups
Dark Chocolate
Soy Nut Butter Filling
4 grams protein/serving $17.99/100pcs Buy Now Peanut Free
Tree Nut Free

FIG. 7

AUTOMATICALLY DESIGNING CUSTOMIZED GARMENTS BASED ON CUSTOMER BEHAVIOR

BACKGROUND

A generation ago, those who were interested in visiting a location would learn of the location from books or other available literature, or by word-of-mouth, before embarking for the location with the guidance of one or more folded paper maps, unable to determine or predict traffic conditions beyond the horizon. Similarly, those who were interested in learning of news or current events, obtaining entertainment or following sporting events would await the delivery of daily or weekly newspapers, magazines or other periodicals, or watch or listen to broadcasted programs at their regularly scheduled times. Those who were interested in obtaining commercial products or services would independently research qualities and features of such products or services before placing orders in person or by telephone, and making payments in cash, by check or money order, or with the physical swipe of a magnetically striped credit card. In particular, those who were interested in purchasing clothes would travel to a retail location, to search for and evaluate garments among shelves, on racks or in bins for their visual appearance and tactile feel, before trying on one or more garments in front of a mirror, a friend or an associate, and returning home after purchasing one or more of the garments.

Today, Internet-enabled computer devices have evolved into essential elements of the commercial experience, as each of these tasks or functions may be executed with the use of one or more Internet-enabled computer devices, often in a matter of seconds or milliseconds. Users of such devices may obtain content regarding travel services, news, current events, entertainment, sports from any number of electronic sources from a broad array of devices including but not limited to desktop computers, laptop computers, mobile devices (e.g., smartphones or tablets), smart speakers, televisions, set-top boxes, refrigerators, automobiles and even wristwatches that may now access the Internet through various wired or wireless means. Additionally, users of such devices may now search for or browse information regarding an ever-widening scope of products or services using one or more websites or dedicated applications.

Online marketplaces (or electronic marketplaces) offer diverse electronic portals, network sites or web sites at which information regarding a variety of items (e.g., goods, products, services or information) may be presented for review, and from which customers may purchase one or more of the items. Such items may be offered for sale by the owners or operators of an online marketplace, or by merchants, vendors or manufacturers of such items, and the online marketplace may present information regarding such items in one or more network pages or web pages, or in user interfaces rendered by one or more dedicated applications (e.g., shopping applications). Such pages may also present information regarding recommendations of items that may be targeted to a particular customer, or a type of customer.

Recommendations of items are typically presented to customers based on their shopping behavior, or on the shopping behavior of others. For example, an item may be recommended to a customer based on relationships between the item and other items that a customer has previously purchased, or considered purchasing. Alternatively, an item may be recommended to the customer based on relationships between the customer and other customers, such as items that were previously purchased or considered for purchase by other customers. Online marketplaces may currently identify recommendations of items for customers based on commonalities of commercial activity, i.e., frequencies with which such items are purchased by multiple customers, or based on similarities between items purchased by such multiple customers. For example, an item may be recommended to a customer if the item is substitutable for another item that the customer has considered for purchase, i.e., if the item is an item that may be purchased in place of the other item, and functionally serve as a substitute for that other item. An item may also be recommended to a customer if the item is a complement to another item that the customer owns or has previously purchased, i.e., if the item may be used or operated along with the other item. Naturally, an online marketplace may only be recommended to a customer if that item currently exists, and if one or more attributes, characteristics or traits of the item are already known.

BRIEF DESCRIPTION OF THE DRAWINGS

FIGS. 1A through 1G are views of aspects of systems for providing customized products based on customer behavior in accordance with embodiments of the present disclosure.

FIGS. 4A through 4C are views of aspects of systems for providing customized products based on customer behavior in accordance with embodiments of the present disclosure.

FIG. 7 is a view of aspects of one system for providing customized products based on customer behavior in accordance with embodiments of the present disclosure.

DETAILED DESCRIPTION

Figure 1A:
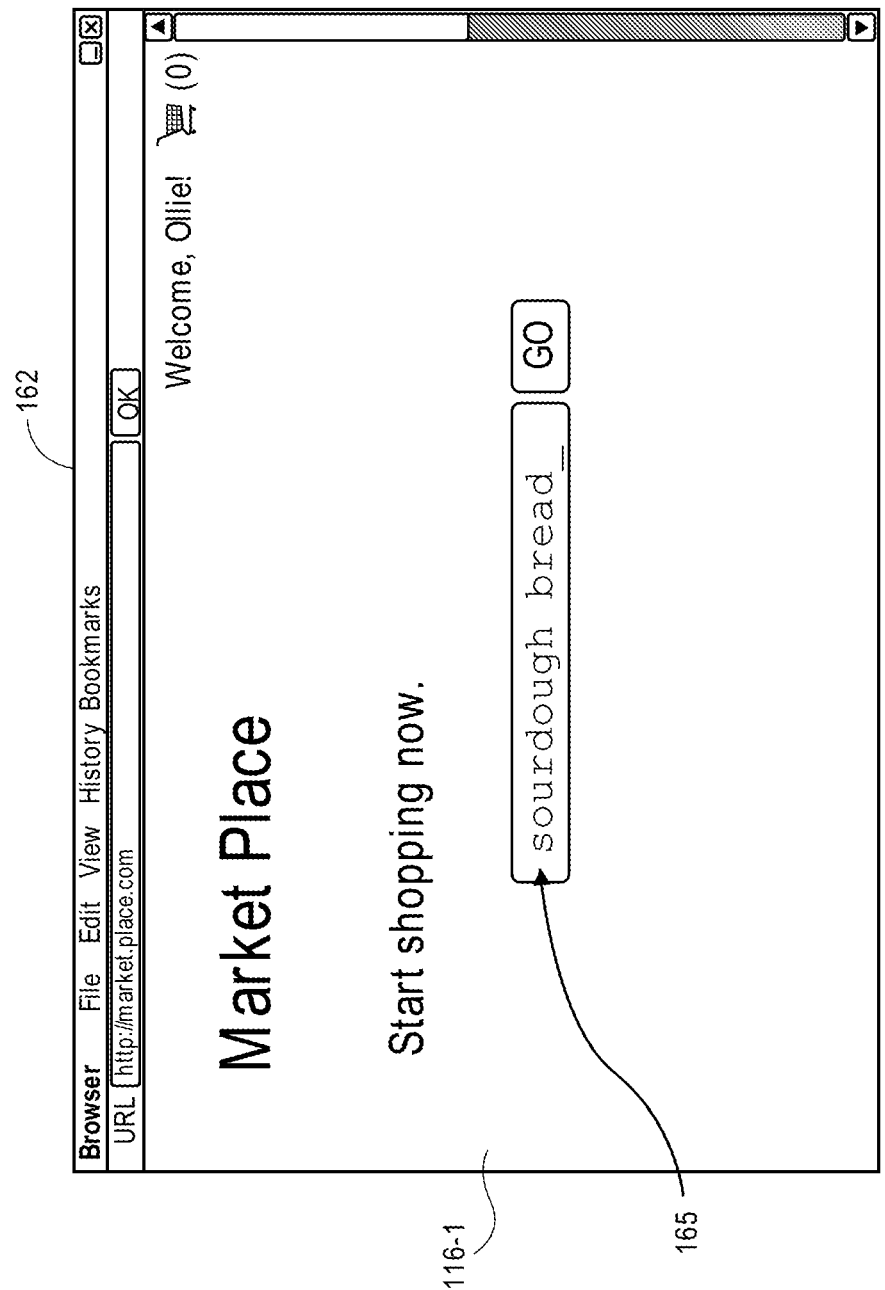

As is set forth in greater detail below, the present disclosure is directed to customizing products for customers based on their behavior. Some embodiments of the present disclosure are directed to determining characteristics, attributes or traits of a customer, and conceiving products (or items) that are not yet in existence but which include one or more components, ingredients, attributes or features that are consistent with the characteristics, attributes or traits of the customer. For example, a customer's preferences may be determined or derived from any information or data that may be known, determined or predicted regarding the customer based on his or her behavior from any source. Such information or data may include, but is not limited to, a customer's searching history, browsing history, purchasing history, shopping lists, "wish lists," and/or merchant relationships or memberships, as well as any virtual locations (e.g., network sites and/or web sites, blogs, social network platforms or the like) or physical locations (e.g., public or private facilities, municipalities, states, provinces, countries, continents or planets) that have been visited by the customer. For example, contents of a network page visited by a customer (e.g., text and/or still or moving images), a streaming audio file or video file accessed by the customer (e.g., lyrics, script, soundtracks, contents of images, metadata), or an electronic message (e.g., text and/or embedded images or links in an E-mail, a SMS or MMS message, a social network message or the like) may be processed in order to recognize one or more aspects of such contents, and to associate such aspects with one or more products, or with components or attributes of such products.

From such information or data, a profile or set of parameters regarding specific components (e.g., ingredients, parts or the like) or attributes (e.g., styles, features or the like) of products (or items) that are favored or disfavored by the customer may be generated. Based on such parameters, a customized product not yet in existence that includes one or more components or attributes that are favored by the customer, or excludes one or more components or attributes that are disfavored by the customer, may be generated and offered to the customer. In some embodiments, the customized product may be entirely novel, e.g., one-of-a-kind, that is conceived or fabricated for the express purpose of offering the customized product to the customer, and is unlike any other product then in existence. In some other embodiments, the customized product may be a variant on an existing product or category of product that includes a favored component or attribute, or excludes a disfavored component or attribute. Therefore, embodiments of the present disclosure may thus recommend a product that does not yet exist to a customer, but may be reasonably anticipated to be preferred by the customer, based on information or data that may be known, determined or predicted regarding the customer.

Referring to FIGS. 1A through 1G, views of aspects of systems for providing customized products based on customer behavior in accordance with embodiments of the present disclosure are shown. As is shown in FIG. 1A, a customer may enter a keyword 165 (viz., "sourdough bread") into a text box at a network page 116-1 associated with an online marketplace that is displayed by a browser 162 operating on a computer device such as a desktop computer, a laptop computer, a mobile device (e.g., a smartphone or tablet computer), or any other computer device that is configured to access the Internet directly or indirectly. Alternatively, the customer may select or otherwise designate a category of products at a network page. In some other embodiments, the customer may enter the keyword 165 or select a category at a page or interface provided by a dedicated application (e.g., a shopping application) operating on a computer device such as a smartphone or tablet computer, or verbally specify the keyword 165 or the category with one or more audible commands, e.g., to a smart speaker that is configured to access the Internet or one or more other networks and to interpret such commands.

Figure 1B:
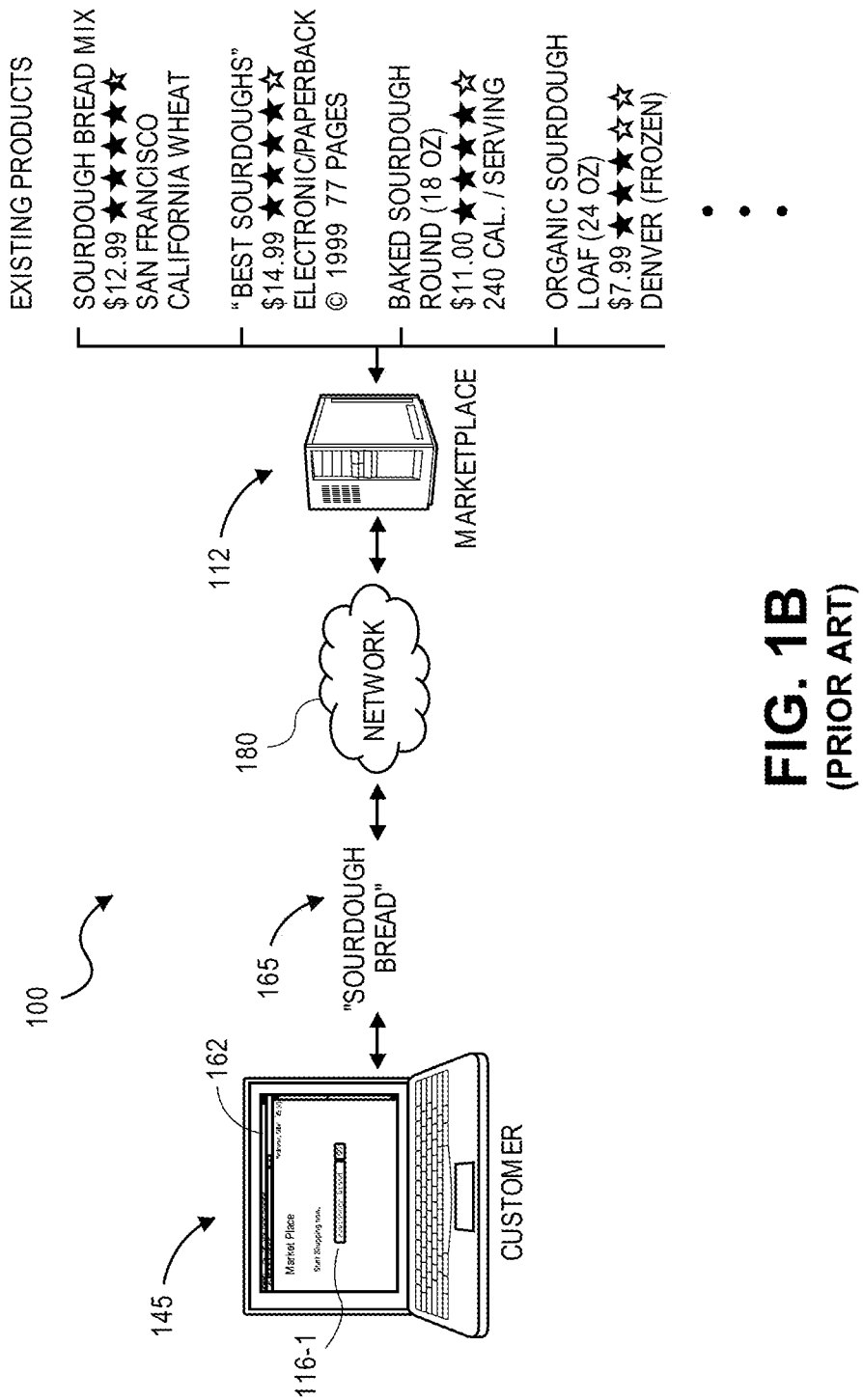

According to one or more prior art systems or methods for recommending products, an online marketplace may search for one or more products corresponding to the keyword 165 entered by the customer. For example, as is shown in FIG. 1B, a prior art system or method may involve an online marketplace server 112 receiving the keyword 165 entered by the customer at the network page 116-1 by way of a computer device 145, over a network 180, and searching for one or more products that are associated with the keyword. As is shown in FIG. 1B, a sourdough bread mix, a sourdough cookbook, and two loaves of sourdough are identified as responsive to the keyword 165 entered by the customer. Information or data regarding one or more of the products, including but not limited to prices, customer ratings (e.g., on a "star"-based scale, or any other quantitative or qualitative scale), or information regarding the contents or quality of the products, may be displayed to the customer in one or more network pages, e.g., on the computer device 145.

Figure 1C:
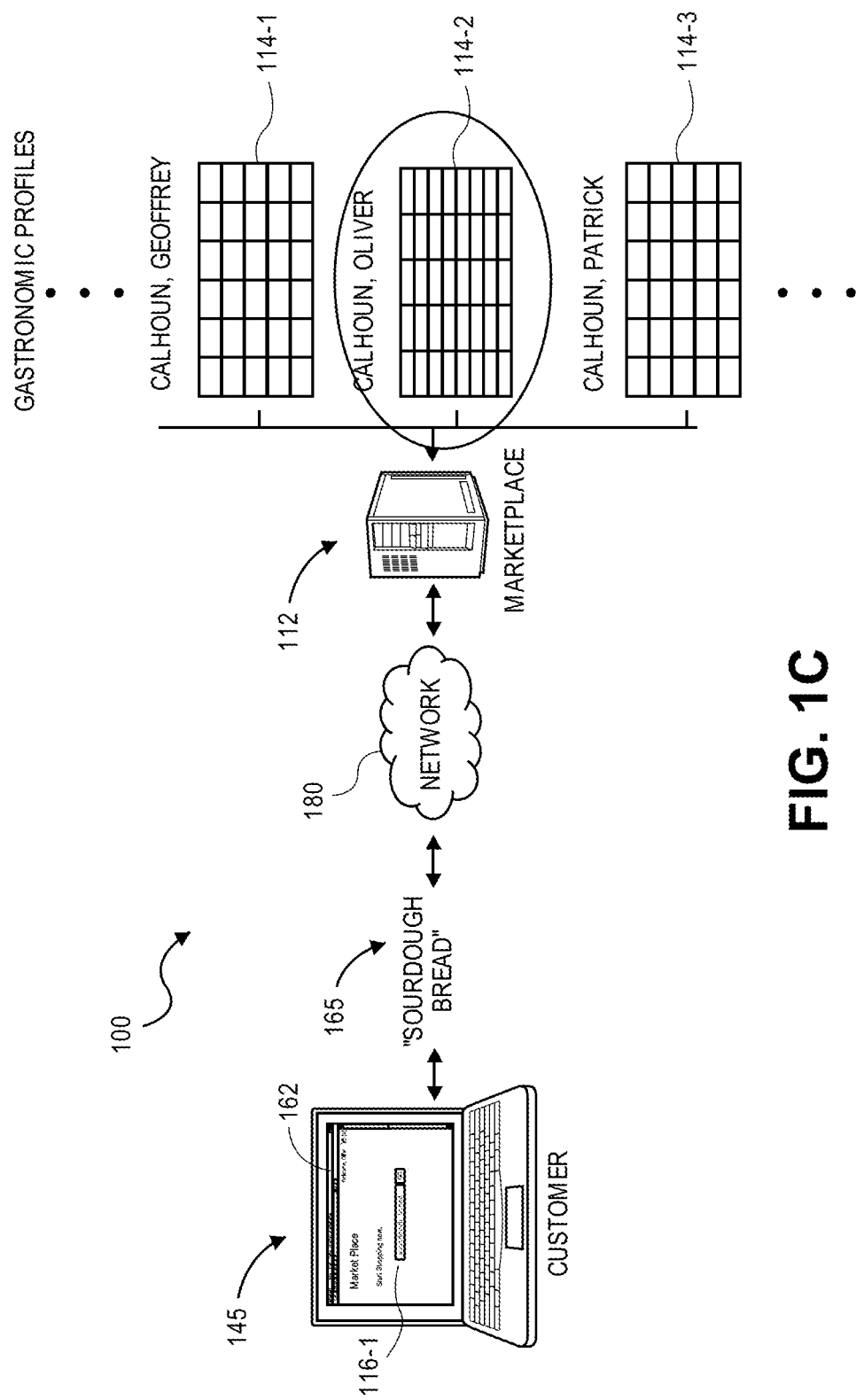

In accordance with embodiments of the present disclosure, customized products may be generated based at least in part on a profile generated from information regarding components (e.g., ingredients or parts) or attributes (e.g., styles or features) that are preferred or disfavored by a customer, and such customized products may include one or more components or attributes that are preferred by the customer, or exclude one or more products that are disfavored by the customer. For example, as is shown in FIG. 1C, the server 112 may have a plurality of gastronomic profiles (or other profiles) 114-1, 114-2, 114-3 stored thereon, including a gastronomic profile 114-2 of the customer that entered the keyword 165 at the network page 116-1 which may be identified, e.g., within one or more files or records at the server 112.

As is shown in FIG. 1D, the gastronomic profile 114-2 of the customer includes information or data regarding food products previously purchased by the customer, as well as discrete labels or identifiers of attributes or features of the food products that are preferred by the customer, or disfavored by the customer, as well as amounts, numbers, masses or volumes (or thresholds thereof) of such food products. For example, the gastronomic profile 114-2 of the customer indicates that the customer has recently ordered a Benedictine spread from Kentucky, a bushel of oranges from Florida, Italian bread from Michigan, corn bread from Iowa, lasagna from Philadelphia and Linguine from Hartford. The gastronomic profile 114-2 further includes the dates on which the food products were ordered, the costs and the amounts or sizes of the food products that were ordered, and the main ingredients of the food products that were ordered.

Additionally, the gastronomic profile 114-2 of the customer further includes a number of qualitative labels or determinations that may be made regarding the customer and components or attributes of food products that the customer prefers or disfavors. For example, based on the known information or data regarding the food products ordered by the customer, it may be determined or predicted that the customer may have a gluten allergy, or that the customer is not allergic to dairy products. Similarly, it may be determined or predicted that the customer enjoys mild-tasting or sweet foods, and that the customer does not consume large amounts of unsaturated fats, but enjoys foods having saturated fats in moderation. Finally, it may be determined or predicted that the customer enjoys gluten-free carbohydrates, such as pastas.

Figure 1E:
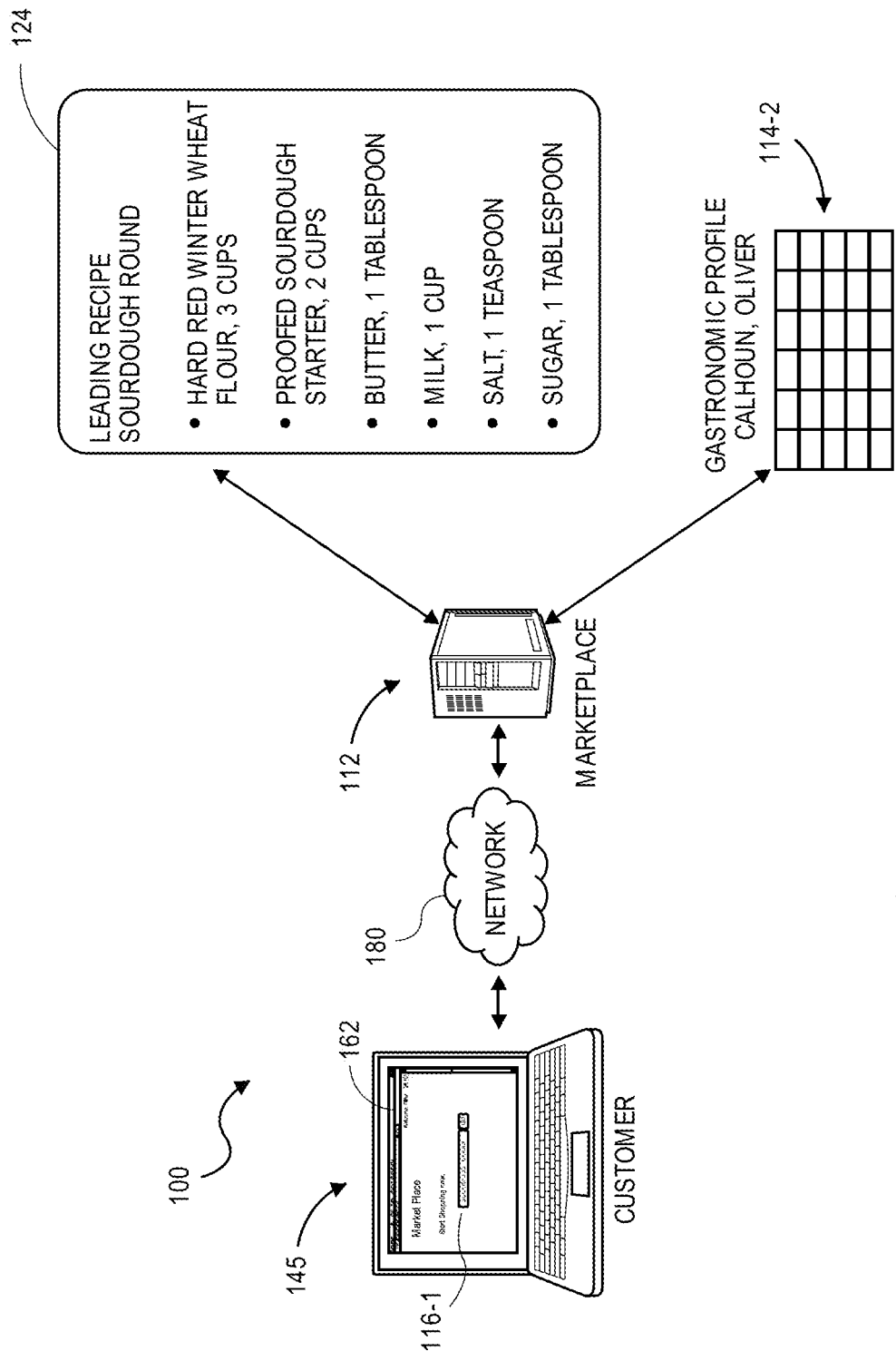
Figure 1F:
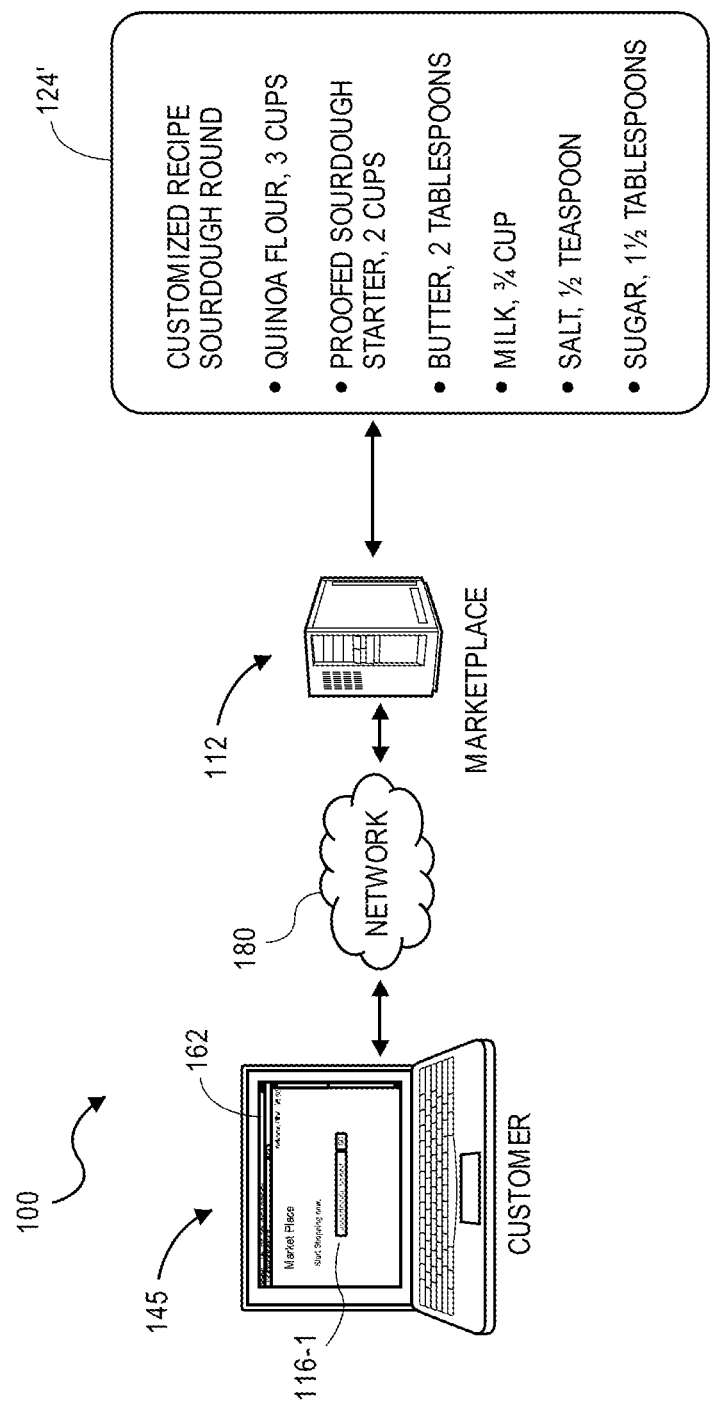

Based on the information that may be known, determined or predicted regarding a customer's interests, e.g., the keyword 165 entered at the network page 116-1 as is shown in FIG. 1A, one or more customized products (e.g., customized food products) that are not yet in existence may be generated for the customer. In some embodiments, the customized product may be prepared according to an existing procedure that is modified based on the contents of a customer profile, e.g., the gastronomic profile 114-2, for the customer. As is shown in FIG. 1E, a recipe (or procedure) 124 for preparing a product of a type or category that is known, determined or predicted to be of interest to the customer (e.g., based on the keyword 165 entered at the network page 116-1 as is shown in FIG. 1A), viz., a round loaf of sourdough bread, is identified. The recipe 124 specifies ingredients such as three cups of a specific type of flour, two cups of a sourdough starter mixture, one tablespoon of butter, one cup of milk, one teaspoon of salt and one tablespoon of sugar. As is shown in FIG. 1F, the server 112 generates a customized recipe (or procedure) 124' for preparing a customized product of the type or category based on the recipe 124 and the gastronomic profile 114-2. For example, the customized recipe 124' replaces the type of flour included in the recipe 124 with *quinoa* flour, which is known to be gluten-free. The customized recipe 124' also includes an additional tablespoon of butter, one-quarter cup less of milk, half of the salt and an additional half-tablespoon of sugar, as compared to the recipe 124.

Information or data regarding a customized product, including but not limited to the customized recipe 124', may be used for any purpose. As is shown in FIG. 1G, a network page 116-2 includes an offer for the purchase of a mixture for preparing the customized product within one hour, or the baking and delivery of the customized product within two hours. The network page 116-2 further includes one or more offers for complements to the customized product, e.g., toppings such as butter or margarine, as well as offers for existing products.

Accordingly, the systems and methods of the present disclosure may be utilized to identify particular components or attributes of products that are of interest to a user, or particular components or attributes of products that are disfavored by the user, based on information or data that may be obtained from the user's interactions with one or more computer devices. A customer profile including details regarding the components or attributes that are preferred or disfavored by the customer may be generated based on such information or data. Components or attributes of products that are preferred by a customer may be determined by any means, such as by aggregating information or data regarding products that are most important to the customer, or components or attributes of such products. For example, one or more machine learning tools, systems, methods or techniques such as a K-means cluster, a principal component analysis, a Bayesian classifier or any other system, method or technique may be used to evaluate products and their respective components or attributes to identify which of such components or attributes, or categories of components or attributes, appears regularly or predominantly in a customer profile. Subsequently, a customized product that is not then in existence may be conceived and a procedure for preparing the customized product may be generated for a customer based on the contents of the customer profile. For example, a customized product may be identified for a customer by determining a relationship between a component or attribute of an existing product and one or more components or attributes listed in a customer profile of the customer, e.g., using any form of matching algorithm, nearest neighbor analysis or other machine learning tools, systems, methods or techniques. One or more offers for the customized product or variants thereof may be presented to the customer.

In some embodiments, the procedure for preparing the customized product may be generated based at least in part on an existing procedure for preparing an existing product, and the existing procedure may be modified to incorporate the substitution of a component or an attribute listed in the customer profile for one or more components or attributes in the existing procedure, to call for the removal of a component or attribute listed in the customer profile from the existing procedure, or to call for the addition of a component or an attribute listed in the customer profile to the existing procedure. In some embodiments, the customer profile may include an amount, a number, a mass, a volume of a component or an attribute that is preferred or disfavored by the customer (or an aggregate or threshold amount, number, mass or volume for the customer) of such food products, or conditions under which a component or an attribute is preferred or disfavored, and the procedure for preparing the customized product may be generated accordingly. Alternatively, in some embodiments, the procedure for preparing the customized product may be generated organically and may include one or more of the components or attributes listed in the customer profile, or may specifically exclude one or more of the components or attributes listed in the customer profile.

A broad and diverse volume of information or data may be known, determined or predicted regarding any person based on his or her use of an Internet-enabled computer device. For example, a browsing application operating on a computer may store information or data regarding network sites, web sites or other files accessed by a user, such as a list of Uniform Resource Identifiers (URIs) and/or Uniform Resource Locators (URLs) of such sites or files, as well as "cookies," or bits of data received by the computer from one or more sites during browsing operations. Such information or data may indicate a preference for one or more people, places or things (e.g., Rebecca Lobo, Mount Rushmore or Halley's Comet), as well as one or more types or categories of people, places or things (e.g., Naval officers, golf courses or snow blowers), based on the content of such sites or files, or terms, or the identifiers or locators typed or entered in order to access such sites or files. Such information or data may be obtained or retrieved from any type or form of network site including but not limited to news sites, blogs, social networks or sources of streaming media.

Moreover, some electronic mail or other messaging services are configured to automatically process e-mail or other electronic messages to recognize keywords or topics discussed or referenced therein. Furthermore, many computer devices that are equipped with position sensors or mapping applications may determine that a user is interested in visiting or has visited any number of locations, and may associate information or data regarding such locations with the user, in order to predict or otherwise determine one or more reasons for the user's interest in such locations.

Additionally, where a user shops at an online marketplace, information or data regarding products in which a customer is (or is not) interested may be determined based on keywords entered or categories selected at a page of a network site accessed by the customer, characteristics or attributes of products displayed or described on pages viewed by the customer, products purchased by the customer or products returned by the customer, as well as times at which the customer enters such keywords, selects such categories, views such characteristics or attributes, or purchases or returns such products, or changes in preferences for such products. Trends regarding a customer interest may also be detected based on changes in such information or data. For example, if a customer acquires a new taste in food, music or literature, or outgrows or eschews a previously favored taste in food, music or literature (e.g., where the customer begins or ends a diet, where a customer purchases or sells a piano, or where a customer searches for books by a specific author on a periodic basis for a period of time before ending the practice) may be known, determined or predicted based on changes in his or her browsing, searching or purchasing histories. Likewise, if a customer is contemplating a purchase of a new home, a new automobile or a new television, this may also be determined from changes in the customer's searching, browsing or purchasing history, such as where the customer searches for keywords or groups of keywords such as "condominium," "real estate attorney" or "schools in Apple Hill"; "sedan," "coupe" or "Jeep"; "HDMI cable," "HDTV," or "cutting the cord" at rates which exceed a mean or expected rate, which may be determined on an annual, seasonal or temporary basis.

Recommendations of products may be identified for a customer based on any available information or data regarding the customer, including but not limited to information or data gleaned from the customer's use of one or more computer devices. For example, according to content-based filtering techniques, comparisons between content of various products may be performed in order to determine which of such products are similar to products that were previously purchased by a customer, or were previously considered for purchase by the customer. In some embodiments, some content-based recommendation services may operate by parsing a customer's favorite network pages (e.g., web pages such as blogs, social networks, sports or news sites) to generate a profile of commonly-occurring terms, and use this information to search for other network pages (e.g., product details pages describing one or more products) that include some or all of these terms. Some such services may weight one or more terms or products more heavily or less heavily on any basis, including a frequency or a recency with which the customer has searched for such pages. Additionally, according to collaborative filtering techniques, products may be recommended based on interests of groups of users without regard to content of the respective products. Some such systems operate based on ratings of products, or indicia of preferences for such products, that are received from one or more members of such groups, and such information may then be used to construct a profile of preference information for the individual members or for the groups as a whole, and such profiles may be compared to those of similar users in order to identify products based on those that were previously purchased by such similar users, or considered for purchase by such similar users.

For example, based on information that may be known, determined or predicted regarding a customer, one or more substitutable products, e.g., products that may be used in place of a product that a customer is known, determined or predicted to own, possess or be considering for purchase, may be identified and recommended to the customer according to one or more content-based and/or collaborative filtering techniques, or any other techniques, two or more of which may be used in connection with one another to identify such recommendations. Likewise, and also based on any such information, one or more complementary products, e.g., products that may be used in connection with, or as complements to, one or more products that are known, determined or predicted to own, possess or be considering for purchase, may be identified and recommended to the customer according to one or more content-based and/or collaborative filtering techniques, which may also be used in connection with one another to identify such recommendations.

Obviously, current systems and methods for identifying recommendations of products are only limited to identifying products that are currently in existence, and for which attributes of such products are currently known. For example, a content-based filtering system may only operate based on comparisons of the content of existing products, which must be known in order for the system to accurately identify similar products based on their respective content. Similarly, a collaborative filtering system may only identify products for a customer based on prior purchases or considerations for purchase of existing products, not theoretical products. These real-world restrictions typically force customers to rank their priorities or choose from suboptimal (or less than fully optimal) products when making a purchase. For example, where a customer prefers that his or her infant wear organic cotton clothing, but identifies a one-piece outfit with a cute or funny print that is formed from polyester, the customer must choose between buying a different one-piece outfit that is formed from organic cotton, which may have a print that is neither as cute nor as funny as the print on the polyester one-piece outfit, or buying the one-piece outfit, which is formed from a synthetic material that is neither organic nor cotton. Plainly, existing systems for identifying recommendations of products to customers are unable to recommend products that do not exist.

The systems and methods of the present disclosure are directed to recommending customized products to customers. Such products may be preemptively customized based on information or data that may be known, determined or predicted regarding the customer from his or her use of one or more computer devices, e.g., Internet-enabled desktop computers, laptop computers, mobile devices or the like. In some embodiments, information or data regarding a customer may be extracted from any source and aggregated, e.g., according to one or more algorithms or techniques, in order to identify one or more products or attributes of products that the customer is known, determined or predicted to prefer, or to disfavor. For example, such information or data may be processed according to a clustering algorithm (e.g., a K-means clustering algorithm or another supervised or unsupervised algorithm or technique) and stored in a profile maintained in one or more data stores. In some other embodiments, a deep learning algorithm or technique may be trained to consider any or all available information or data regarding products or attributes of products that a customer is known, determined or predicted to prefer, and to recognize one or more of such products or attributes that stands out, or is otherwise statistically significant.

The information or data regarding a customer's interest or disinterest in one or more products may be aggregated, clustered, grouped, sorted and/or stored on any basis. Likewise, a customer profile may be defined on any basis (e.g., in a quantitative and/or a qualitative manner) and at any level of granularity or precision with respect to one or more products or components or attributes thereof. For example, where a customer profile is generated based on a customer's interest in different types or ingredients of foods (e.g., a gastronomic profile or other component profile), the profile may be defined based on any nutritional components or attributes of such foods in which the customer is interested (e.g., protein levels, fat levels, caloric content, sugars, grains or nuts), as well as percentages or ratios of composition in absolute or relative terms, or with respect to one or more predetermined standards (e.g., United States Food & Drug Administration recommendations). A gastronomic profile may also be defined based on flavors (e.g., sweet, sour, bitter, salty and savory or umami, or any other flavors), physical appearances (e.g., colors, sizes or shapes), countries of origin (e.g., Spanish wine, Mexican avocadoes, Korean kimchi). Additionally, a gastronomic profile may also indicate an extent to which a specific ingredient is merely preferred (or disfavored), or is essential (or must be excluded). For example, a gastronomic profile may indicate whether a customer is known, determined or predicted to be allergic to one or more foods or ingredients thereof, and that such foods or ingredients may not be provided to the customer under any circumstances, or whether the customer merely dislikes one or more of such foods or ingredients are merely preferably excluded from the customer. Furthermore, a gastronomic profile may also indicate whether the customer prefers foods or ingredients at any particular temperature, or in any particular style or format.

Similarly, where a customer profile is generated based on a customer's interests in different types or components or attributes of articles of clothing (e.g., a clothing profile, a couture profile, a style profile or a component profile), such interests may be determined from any source, including information or data regarding items purchased by the customer, items evaluated for purchase by the customer, network pages visited by the customer (e.g., blogs, social networks or other sites), or any other information or data. For example, information or data regarding such interests may be used to predict types or categories of clothing that are desired by the customer (e.g., dresses, shirts, jeans, slacks, gowns, sportswear or activewear, jackets, suits, shoes, fashion accessories or the like), as well as clothing materials that are preferred by the customer (e.g., fibers of cotton such as long-staple cotton, Egyptian cotton, linens or organic cotton, as well as silk, polyester, wool or cashmere; yarns such as two-ply 80-count yarns, two-ply 100-count yarns, one-ply 50-count yarns in the warp or weft directions; or weights, thicknesses or densities of fabric). The information or data may also be used to determine methods for manufacturing clothing (e.g., weaves such as plain, poplin, oxford, fil-a-fil, twill, flannel, seersucker, satin, dobby or herringbone), including treatments of such clothing (e.g., sanforization, softening, pre-wearing or pre-washing), that are preferred by the customer. The information or data may also be used to determine any cuts of clothing, sizes or fits of clothing, or colors that are preferred by the customer. For example, where it is determined that a customer is interested in purchasing a dress, whether the customer prefers an A-line, empire waist, wrap dress, full skirt, maxi dress, peplum, sheath, tea length, mermaid length, baby doll, body con, halter, shift dress, spaghetti straps, one-shoulder, qipao, slip dress, strapless dress, pouf, shirt dress, maid dress, apron dress or a sun dress may be determined from the customer's purchasing history, as well as locations visited by the customer, network pages visited by the customer, or any other information or data that may be determined regarding the customer. Similarly, variables regarding the size and fit of dresses preferred by the customer (e.g., a length, a bust, a nape-to-waist, an armhole depth, a back width, a neck size or a shoulder width) may also be determined.

The systems and methods of the present disclosure are not limited to merely customizing food products or articles of clothing, however. For example, a customer profile indicative of whether a customer prefers or disfavors computers or other machines having specific components or attributes (e.g., processors or engines from a particular manufacturer or country of origin, a "machine profile") or multimedia (e.g., additional tracks or audio or video content, a "viewing profile" or a "listening profile") having specific audio or video features may be generated based on any information or data that may be known, determined or predicted regarding the customer from his or her use of one or more computer devices (e.g., Internet-enabled computer devices). Any customer profile that is generated for a customer may be updated on a rolling, ongoing basis to indicate whether a customer's interests or tastes have changed, such as where a customer's interest in a product or component or attribute of a product has increased or decreased by any measure, and any information or data reflecting changes in such interests or tastes may be utilized in defining a customer profile thereby. Moreover, a customer profile may also include an amount, a number, a mass, a volume of a component or an attribute that is preferred or disfavored by the customer (or an aggregate or threshold amount, number, mass or volume for the customer).

After a profile has been generated for a customer, information or data may be identified regarding a product, or a type or category of product, in which the customer is interested on any basis, including but not limited to one or more interactions by the customer with an Internet-enabled computer device. For example, a customer may be determined to be interested in a product based on an entry of one or more keywords into a search box ("fireworks" or "July 4") associated with an online marketplace, a selection of a category at an online marketplace ("fertilizer" or "lawn care"), or a viewing of an electronic mail or other message regarding the product or the type or category of product (e.g., an electronic advertisement). The customer may also be determined to be interested in a product where the customer visits or otherwise accesses one or more network pages associated with the product or a type or category that includes the product (e.g., a product details page associated with the product), or travels to a location associated with the product. For example, where a customer visits the U.S.S. Arizona Memorial in Honolulu, Hi., the Baseball Hall of Fame in Cooperstown, N.Y., or Pepe's Pizza in New Haven, Conn., the customer may be generally assumed to have an interest in history, sports or fine cuisine in general, or in World War II history, baseball or nationally renowned pizza in particular. Any type or form of data or metadata regarding a customer's interactions with an Internet-enabled computer device, including but not limited to the dates or times of such interactions, or the locations at which such interactions occurred, may be utilized in determining a customer's level of interest in one or more products or types or categories of products.

Once information or data regarding a customer's interest in one or more products has been identified, a procedure, a process or a technique for customizing a product to include a component or an attribute that is preferred by the customer, or to exclude a component or an attribute that is disfavored by the customer, may be determined. For example, where a procedure such as a recipe or a set of steps or instructions for preparing a product is identified, the procedure may be modified in accordance with a customer profile of the customer, such as to add (e.g., as a substitute or a complement), any number of components or attributes that the customer is known, determined or predicted to prefer, or to remove any number of components or attributes that the customer is known, determined or predicted to disfavor. For example, where a customer indicates an interest in soft pretzels, and a customer profile (e.g., a component profile), such as a gastronomic profile, indicates that the customer likely enjoys or dislikes salt on his or her foods, a recipe for preparing soft pretzels may be modified to include additional salt or to remove all salt (e.g., to use one or more salt substitutes). Where the gastronomic profile indicates that the customer prefers ingredients of a specific type or from a specific location, e.g., Himalayan salt, the recipe may be modified to require preparing the soft pretzels with Himalayan salt, rather than traditional iodized salt, or salt of an unspecified origin. Where the gastronomic profile indicates that the customer prefers products of a specific size or within a range of sizes, e.g., large or small pretzels, the recipe may be modified to call for preparing the pretzels of the specific size or within the range of sizes. A procedure for preparing a product may be customized in any manner in order to reflect a customer's interests or preferences in one or more specific products or components or attributes thereof.

Alternatively, a procedure for preparing a customized product may be generated out of whole cloth, in order to satisfy a customer's known, determined or predicted level of interest in one or more products, or components or attributes thereof. For example, where a customer is a cyclist, and is also interested in products having light-weight components or attributes, a procedure for manufacturing a bicycle with a chain formed from boron, which is less dense than aluminum or steel, may be generated, and a bicycle having a boron chain may be recommended to the customer accordingly, even if a bicycle having a boron chain has never previously been manufactured. A procedure may be customized or generated to optimize the value or extent of a specific variable corresponding to a component, e.g., an amount of sugar, a level of sweetness or a number of calories, or an attribute, e.g., a style, a cut, a size or a shape, that is preferred by a specific customer, such as to result in a customized product having a specific composition, size, shape, cost or other attribute. For example, where a customer is known, determined or predicted to have a kitchen having an opening or space of a specific shape and volume, a model of dishwasher or microwave oven may be custom designed to have an exterior that may be accommodated within the opening or space.

The systems and methods of the present disclosure may be configured to produce any type or form of work product regarding a customized product. For example, one or more of the embodiments disclosed herein may be configured to fabricate a customized product, or a set of instructions for fabricating the customized product (e.g., a recipe book or an assembly manual), and the customized product or the instructions may be made available to the customer. Additionally, all or a subset of the materials required to prepare a customized product may be made available to a customer. For example, where a customized recipe for tiramisu that relies on a specific type of Lombardia mascarpone cheese, a specific type of Sumatran coffee grounds, and a specific type of Spanish brandy is generated based on a customer's known, determined or predicted interests, the customized recipe may be offered to the customer directly, or provided to a restaurant that the customer frequents. Alternatively, tiramisu may be prepared according to the customized recipe and, in some embodiments, delivered to the customer.

A customer profile may also indicate restrictions on the use or inclusion of one or more components or attributes on any basis, including one or more restrictions of a medical, a moral or a social nature. For example, where a customer is known, determined or predicted to be experiencing a discrete medical condition, practicing a specific religious faith or associating with one or more groups having dietary or commercial restrictions (e.g., the customer purchases only foods or clothing obtained from a "fair trade" source, or is boycotting a specific source), recipes for preparing foods or procedures for preparing clothing that exclude one or more ingredients associated with the medical condition, the religious faith or the association with the one or more groups may be identified or generated and one or more products prepared in accordance with the recipes may be recommended to the customer. Similarly, restrictions on the composition of garments, machines, multimedia or any other type or form of consumer goods may be identified based on any information or data regarding a customer's interactions with a computer device, and a customized product that is consistent with such restrictions may be generated accordingly.

Information or data regarding products that are preferred or disfavored by a customer may be utilized for any purpose. For example, a customized product that is conceived, generated or prepared based on components or attributes that are preferred or disfavored by a customer may be recommended to other customers having similar attributes. Information or data regarding such customers' evaluations or ratings of such customized products may be determined and/or tracked. Moreover, customized products that are conceived with components or attributes that customers prefer or disfavor, and are identified as desirable and/or attractive alternatives, may be marketed to mainstream customers, even customers who are not known, determined or predicted to prefer or disfavor the same components or attributes.

Figure 2A:
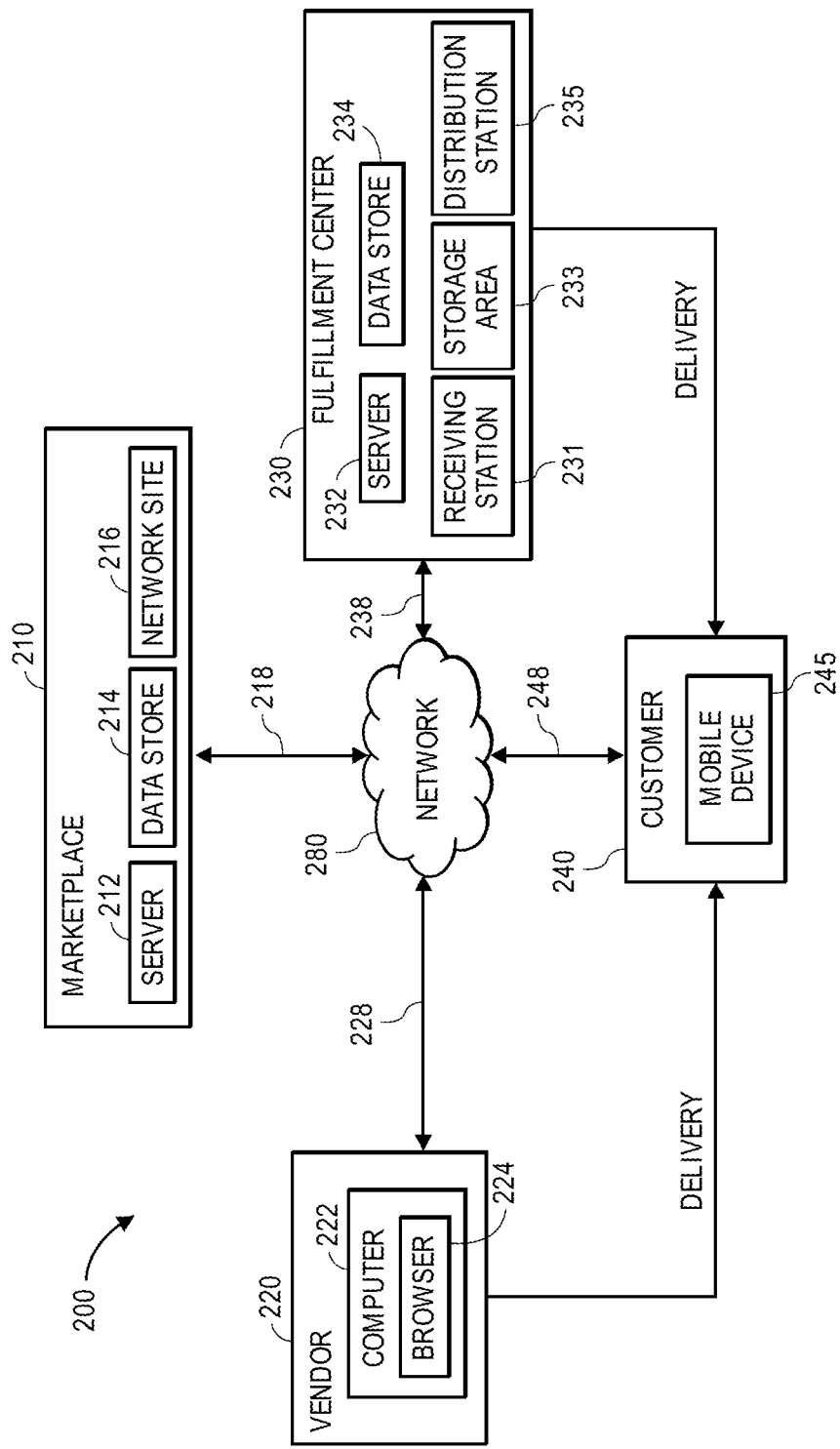
FIGS. 2A and 2B are block diagrams of one system for providing customized products based on customer behavior in accordance with embodiments of the present disclosure.
Figure 2B:
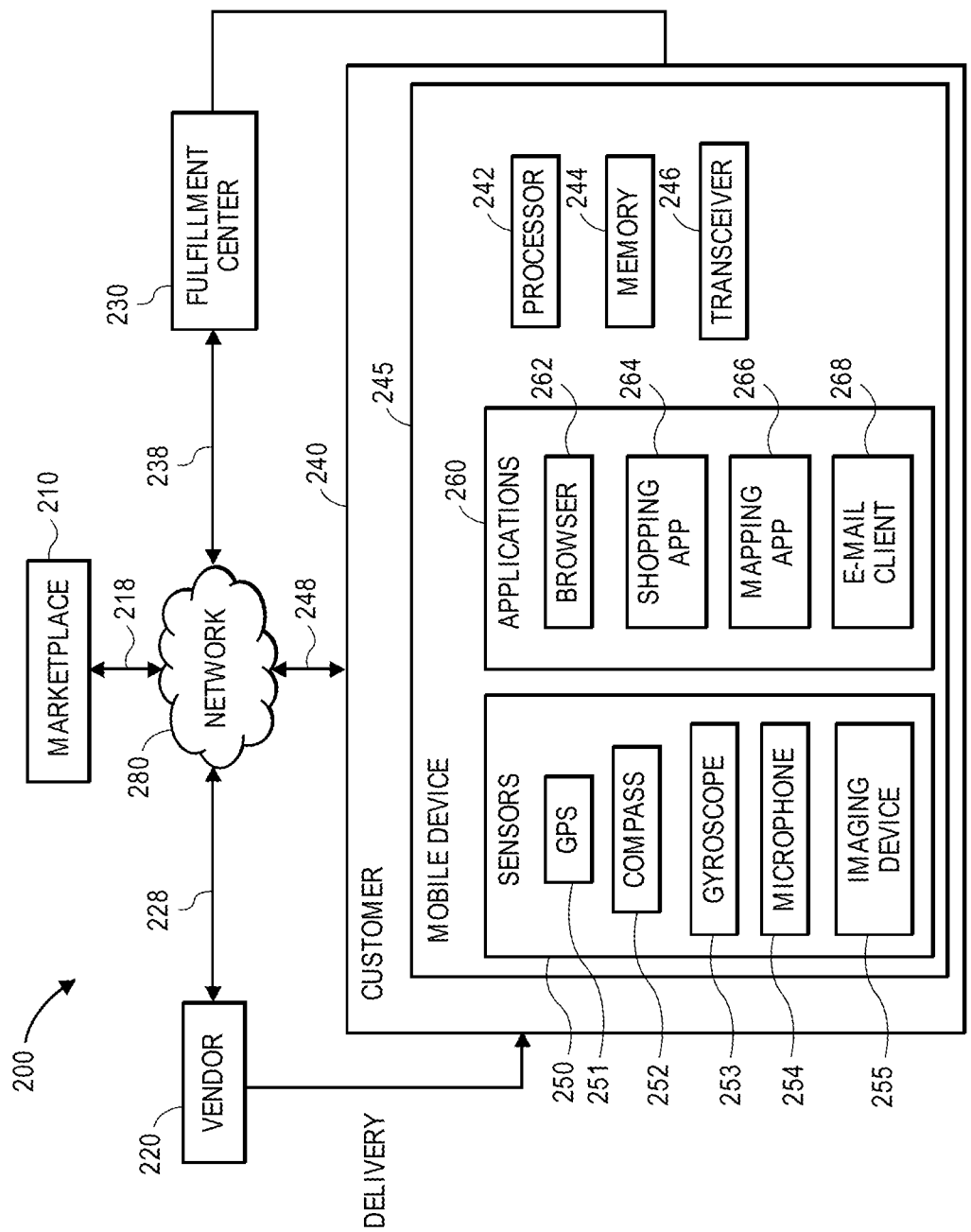

Referring to FIGS. 2A and 2B, block diagrams of a system 200 for providing customized products based on customer behavior in accordance with embodiments of the present disclosure are shown. Except where otherwise noted, reference numerals preceded by the number "2" in FIG. 2A or FIG. 2B refer to elements that are similar to elements having reference numerals preceded by the number "1" shown in FIGS. 1A through 1G.

As is shown in FIGS. 2A and 2B, the system 200 includes a marketplace 210, a vendor 220, a fulfillment center 230 and a customer 240 that are connected to one another across a network 280, which may include the Internet in whole or in part.

The marketplace 210 may be any entity or individual that wishes to make items (which may include goods, products, services or information of any type or form) from a variety of sources (e.g., vendors, manufacturers, merchants or sellers) available for download, purchase, rent, lease or borrowing by customers using a networked computer infrastructure, including one or more physical computer servers 212 and data stores 214 (e.g., databases) for hosting a network site 216. The marketplace 210 may be physically or virtually associated with one or more storage or distribution facilities, such as the fulfillment center 230. The network site 216 may be implemented using the one or more servers 212, which connect or otherwise communicate with the one or more data stores 214 as well as the network 280, as indicated by line 218, through the sending and receiving of digital data. Moreover, the data stores 214 may include any type of information regarding items that have been made available for sale through the marketplace 210, or ordered by customers, such as the customer 240, from the marketplace 210, or any information or data regarding the delivery of such items to the customers. The data stores 214 may include any information or data regarding customers and items that the customers prefer or disfavor, including but not limited to histories of searching or browsing for information or data regarding such items, e.g., by way of the network site 216, or histories of purchasing such items or considering such items for purchase.

The vendor 220 may be any entity or individual that wishes to make one or more items available to customers, such as the customer 240, by way of the marketplace 210. The vendor 220 may operate one or more order processing and/or communication systems using a computer 222 (e.g., a desktop computer, a laptop computer, a tablet computer, a smartphone or any other computer device) and/or software applications such as a web browser 224, which may be implemented through the computer 220 or one or more other computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to the customer 240 directly, or to one or more designated facilities maintained by or on behalf of the marketplace 210, such as the fulfillment center 230. Additionally, the vendor 220 may receive one or more items from other vendors, manufacturers or sellers (not shown), and may deliver one or more of such items to the customer 240, or to one or more locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items. As is shown in FIG. 2A, the fulfillment center 230 includes a server 232 and a data store 234, as well as any other computer-related equipment that may be necessary or desired for the receipt, the storage, the processing or the distribution of items. The fulfillment center 230 also includes stations for receiving, storing and distributing items to customers, including but not limited to a receiving station 231, a storage area 233 and a distribution station 235.

The server 232 and/or the data store 234 may operate one or more order processing and/or communication systems and/or software applications having one or more user interfaces, or communicate with one or more other computing devices or machines that may be connected to the network 280, as is indicated by line 238, in order to transmit or receive information in the form of digital or analog data, or for any other purpose. For example, the server 232 and/or the data store 234 may also operate or provide access to one or more reporting systems for receiving or displaying information or data regarding orders for items received by the marketplace 210, and may provide one or more interfaces for receiving interactions (e.g., text, numeric entries or selections) from one or more operators, users, workers or other persons in response to such information or data. The server 232 and/or the data store 234 may be a general purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users, workers or persons.

The receiving station 231 may include any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The storage area 233 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 235 may include one or more regions or stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones). Those of ordinary skill in the pertinent art will recognize that shipments of items arriving at the receiving station 231 may be processed, and the items placed into storage within the storage areas 233 or, alternatively, transferred directly to the distribution station 235, or "cross-docked," for prompt delivery to one or more customers.

The fulfillment center 230 may further include one or more control systems that may generate instructions for conducting operations at one or more of the receiving station 231, the storage area 233 or the distribution station 235. Such control systems may be associated with the server 232 and/or the data store 234, or with one or more other computing devices or machines, and may communicate with the receiving station 231, the storage area 233 or the distribution station 235 within the fulfillment center 230 by any known wired or wireless means, or with the marketplace 210, the vendor 220 or the customer 240, or one or more other entities or computer devices, over the network 280, as indicated by line 238, through the sending and receiving of digital data.

Additionally, the fulfillment center 230 may include one or more systems or devices (not shown in FIG. 2A) for determining locations of one or more elements therein, such as cameras or other image recording devices. Furthermore, the fulfillment center 230 may also include one or more workers or staff members, who may handle or transport items within the fulfillment center 230. Such workers may operate one or more computing devices or machines for registering the receipt, retrieval, transportation or storage of items within the fulfillment center, or a general purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The customer 240 may be any entity or individual that wishes to download, purchase, rent, lease, borrow or otherwise obtain items from the marketplace 210 or the vendor 220. The customer 240 may utilize one or more computing devices, such as a mobile device 245 (e.g., a smartphone, a tablet computer, a laptop computer, or computing devices provided in wristwatches, televisions, set-top boxes, automobiles or any other appliances or machines), or any other like machine. Alternatively, the customer 240 may utilize one or more other or additional computing devices, e.g., desktop computers, laptop computers or any other like machines. The mobile device 245 may include one or more processors 242, memory components (e.g., databases) 244, and transceivers 246 (e.g., transmitters and/or receivers), as well as any number of input/output devices (not shown), such as keyboards, keypads, mice, styluses, touchscreens, RFID readers, or other devices. The transceivers 246 may be configured to communicate with one or more computer devices over the network 280, and may also be utilized to transmit or receive cellular telephone signals to or from a cellular telephone network source (not shown) in the form of audio communications, network communications packets, SMS or MMS text messages, social network messages, or any other form of data that may be transmitted by or through such means. Any type of transmitting and/or receiving equipment that is configured to transmit and/or receive information of any type or form, and according to any protocol, may be utilized in connection with the computer devices disclosed herein, in accordance with the present disclosure.

The mobile device 245 also includes a plurality of sensors 250 and a plurality of applications 260 configured for operation thereon. The sensors 250 may include a Global Positioning System ("GPS") sensor 251, a compass 252, a gyroscope 253, a microphone 254 and an imaging device 255. The GPS sensor 251 may be used to determine geolocations of the mobile device 245, and may be in communication with one or more orbiting satellites or other components of a GPS system. Information or data received from such satellites may be used to determine a geolocation, or a geospatially-referenced point that precisely defines an exact location in space with one or more geocodes, such as a set of geographic coordinates, e.g., a latitude and a longitude, and, optionally, an elevation that may be ascertained from signals (e.g., trilateration data or information) or geographic information system (or "GIS") data, e.g., data received from one or more orbiting satellites. Geolocations of the GPS sensor 251, as determined by the mobile device 245, may be associated with the customer 240, where appropriate.

The compass 252 may be adapted to determine one or more directions with respect to a frame of reference that is fixed with respect to the surface of the Earth (e.g., a pole thereof). Additionally, the gyroscope 253 may be adapted to determine an angular orientation or velocity of the mobile device 245 based on principles of angular momentum. The microphone 254 may include any number of other components or features for detecting and capturing acoustic energy in a vicinity of the mobile device 245. For example, the microphone 254 may be provided as a discrete component, or in combination with one or more other components, e.g., the imaging device 255. Furthermore, the microphone 254 may be configured to detect and record acoustic energy from any and all directions.

The imaging device 255 may be a digital camera or other optical recording device, e.g., a digital camera, depth sensor, range camera, infrared camera or radiographic camera. In some embodiments, the imaging device 255 may be an autofocusing camera having any number (e.g., eight to forty-eight megapixels) or size of pixel sensors (e.g., approximately one micron), any relative apertures or focal lengths, or any numbers of lenses, filters, or other components that are configured to capture still or moving images and any associated audio signals or metadata (e.g., geotags or date or time stamps). The imaging device 255 may be configured to capture one or more sets of imaging data, e.g., at the instruction of the processor 242, and to store such imaging data in the memory component 244 or in association with one or more other computer devices, e.g., over the network 280.

The imaging device 255 may be configured to capture imaging data, e.g., visual imaging data, depth imaging data, infrared imaging data, or imaging data of any other type or form. Imaging devices, such as the imaging device 255, generally operate by capturing light that is reflected from objects, and by subsequently calculating or assigning one or more quantitative values to aspects of the reflected light, e.g., image pixels, then generating an output based on such values, and storing such values in one or more data stores. For example, a digital camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green or blue) of the reflected light, or distances to objects from which the light was reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network as the Internet.

In some embodiments, the imaging device 255 may be configured to capture and store visual imaging data (e.g., visual images, or color images), such as an RGB ("red-green-blue") imaging device (or camera). In some embodiments, the imaging device 255 may be an imaging device that is configured to capture both visual imaging data and depth imaging data (e.g., depth images, or ranges), such as an RGBD or RGBz imaging device (or camera). Imaging data files captured by the imaging device 255 be stored in any number of formats, including but not limited to JPEG or JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files. A visual image may be an image channel or file captured from a scene by an imaging device, with the visual image including a plurality of pixels, and each of the pixels representing one or more color values for visible light captured by an image sensor from a portion of the scene that corresponds to one of the pixels (e.g., black-and-white, grayscale, or color according to any standard or color model, such as RGB, CMYK or the like). A depth image may be an image channel or file captured from a scene by an imaging device, with the depth image including a plurality of pixels, and each of the pixels representing a range or distance from an image sensor to a portion of the scene that corresponds to one of the pixels. Alternatively, any other type of imaging data may be captured by the imaging device 255 and utilized in accordance with one or more embodiments of the present disclosure, including but not limited to infrared images, radiographic images or any other representations of captured light.

The mobile device 245 may further include any number of other sensors (not shown), including but not limited to one or more speedometers, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, radiation sensors (e.g., Geiger counters, neutron detectors, alpha detectors), accelerometers, ranging sensors (e.g., radar or LIDAR ranging sensors) or other sound sensors (e.g., piezoelectric sensors, vibration sensors or other transducers for detecting and recording acoustic energy from one or more directions). Each of such other sensors may be in communication with or operated under the control of the processor 242, the memory 244 and/or the transceiver 246.

The applications 260 may include a browser 262, a shopping application 264, a mapping application 266 and an E-mail client 268. The browser 262 may be any client-side application that retrieves, processes and renders Internet or other network-based content in response to a request for such content. The browser 262 may operate by receiving code from one or more servers and/or server-side applications according to a certain protocol, such as Hypertext Transfer Protocol (or "HTTP"), and assembling one or more objects based on or derived from the code into a network page, such as a web page, that is displayed on a user interface. The browser 262 may usually include one or more engines for translating information received from servers into renderable content, interpreters for parsing and executing scripts, and caches or other data stores for storing information in the form of "cookies," or files that relate to a user's browsing activity, which may be retrieved by one or more sites in the future. The customer 240 may request one or more files associated with a URI, a URL or another file location, e.g., by entering a URI or URL into an address box or address bar; by selecting an image or set of text that may be hyperlinked to a URI or URL; or by selecting a bookmark, a home button or any other feature that may be linked to or otherwise associated with a URI or URL. In response to such a request, a server associated with the URI or URL (e.g., the server 212 or the servers 232) handles the request by providing code expressed in one or more computer languages, such as Hypertext Markup Language (or "HTML") and the browser 262 then uses one or more rendering engines (or layout engines) to display the code provided by the server into the page, which may include one or more files embedded within the code provided by the server.

The shopping application 264 may be any dedicated application for accessing one or more network-based portals, e.g., the network site 216 or any other resource associated with the marketplace 210 or the vendor 220, and may, but need not, include or operate one or more components of a browser thereon. The mapping application 266 may be any application that is configured to receive position signals, e.g., by way of the GPS sensor 251 or, alternatively, the transceiver 246 or any other source, and to interpret such signals for any purpose. For example, the mapping application 266 may be configured to determine an optimal path or route between two locations on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. The E-mail client 268 may be any application for generating, viewing, editing, transmitting, receiving and/or storing E-mail messages, and may include any additional relevant or unrelated capacities or specifications. Additionally, the E-mail client 268 may operate in conjunction with one or more other applications or systems that may, but need not, be related to the sending or receipt of E-mail, including but not limited to calendar applications, contact management applications, task management applications or any other like applications. Additionally, the mobile device 245 may operate any number of other applications thereon, including but not limited to one or more applications for accessing social networks.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center," a "customer," or like terms, may be typically performed by a human operator, but could, alternatively, be performed by an automated agent.

The marketplace 210, the vendor 220, the fulfillment center 230 or the customer 240 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages, social network messages or the like. For example, the fulfillment center 230 and/or the server 232 may be adapted to transmit information or data in the form of synchronous or asynchronous messages to the marketplace 210 and/or the server 212, the customer 240 and/or the mobile device 245, or any other computer device in real time or in near-real time, or in one or more offline processes, via the network 280. Those of ordinary skill in the pertinent art would recognize that the marketplace 210, the fulfillment center 230 or the customer 240 may operate any of a number of computing devices that are capable of communicating over the network 280, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 212, 232 and/or the mobile device 245, or any other computers or control systems utilized by the marketplace 210, the fulfillment center 230 or the customer 240 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
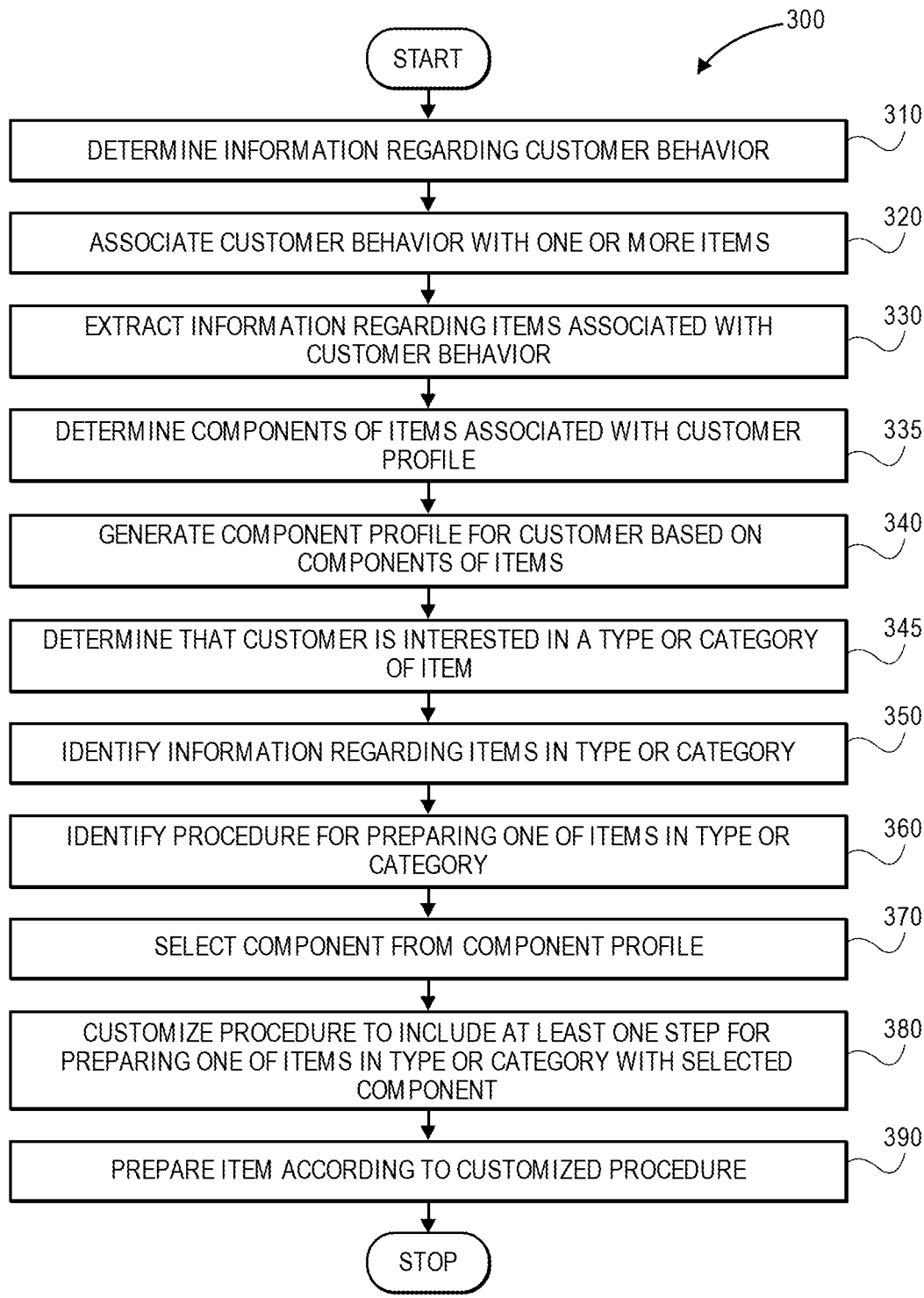
FIG. 3 is a flow chart of one process for providing customized products based on customer behavior in accordance with embodiments of the present disclosure.

As is discussed above, some embodiments of the systems and methods of the present disclosure are directed to preparing customized products based on customer behavior, including but not limited to behavior that indicates that a customer prefers or disfavors one or more discrete components or attributes of items. A customized product that includes components or attributes that the customer prefers, or excludes components or attributes that the customer does not prefer, may be generated and marketed to the customer accordingly. Referring to FIG. 3, a flow chart 300 of one process for preparing customized products based on customer behavior in accordance with embodiments of the present disclosure is shown. At box 310, information regarding a customer's behavior is determined. The information may be obtained from any number of computer devices associated with the user, e.g., a desktop computer, a laptop computer, a smartphone, a tablet computer, a smart speaker, an automobile, an appliance or any other Internet-enabled devices. For example, information regarding the customer's behavior may be determined from one or more external resources including but not limited to one or more online marketplaces, e.g., the customer's browsing, searching and/or purchasing histories. Information regarding the customer's behavior may also be obtained from one or more other external resources, including but not limited to social networks, electronic mail servers, SMS or MMS message servers, calendar files, or telephone records. Information regarding the customer's behavior may be further obtained from one or more records of browsing or searching histories in one or more cache files, folders or other locations in a data store or other memory component of a computer device, as well as a list or record of URIs or URLs accessed, visited or viewed by a browser or another application. Information regarding the customer's behavior may also be obtained from one or more cookies or other files obtained from one or more network sites or other external resources. Information regarding the customer's behavior may also be obtained based on coordinates or other records of positions of a computer device (e.g., a mobile device, such as a smartphone or tablet computer) or media files played by the computer device (e.g., music, videos and/or other multimedia).

At box 320, the customer's behavior is associated with one or more items. For example, where a customer is determined to have visited one or more network pages including information or data regarding an item (e.g., a blog discussing an item, a social network page hosted by a manufacturer or users of the item, a product details page for reviewing or purchasing the item, or any other external resource including information identifying, describing or referencing the item), the customer's behavior may be associated with that item. Alternatively, where a customer visits a location or engages in an activity, or expresses interest in the location or the activity. For example, where a customer visits a vineyard in Napa Valley in May, the customer's activity may be associated with vineyards, wines, the State of California (or the San Pablo Bay area), or the month of May, or items or events associated therewith. Where a customer goes for a jog along the Charles River in April, the customer's activity may be associated with jogging, rivers, the Commonwealth of Massachusetts (or Boston or Cambridge), or the month of April, or items or events associated therewith. The information regarding the customer's behavior determined at box 310 may be evaluated or processed in any manner, e.g., according to one or more algorithms or techniques, in order to associate the customer's behavior with one or more items in accordance with the present disclosure.

At box 330, information regarding the item associated with the customer behavior at box 320 is extracted, e.g., from one or more sources of information or data regarding such items. For example, where the customer's activity is associated with an item based on a customer's viewing or access of one or more network sites, information regarding the item may be extracted from such sites, or from one or more other network sites or any other external resources that may be identified and associated with the item. Such network sites or other external resources may be authenticated or validated in any manner, or confirmed to be legitimate, in any manner. The information extracted may include any intrinsic or extrinsic data regarding the item, and may identify a source (e.g., a manufacturer and/or a location of origin), one or more components or attributes of the item (e.g., ingredients, parts or the like), as well as any records of the use of the items (e.g., use restrictions or limitations of a specific item, or of a type or category of items), or any other information. At box 335, components of the items associated with the customer profile are determined. For example, components or attributes of items may be identified based on their respective concentrations in the items (e.g., in a descending order), without regard to their respective concentrations, or in any other manner. Where the item is a prepared food product, components may be determined from a list of ingredients, a set of nutrition facts, a procedure (e.g., a recipe) for preparing the food product, or from any other source. Where the item is a non-food consumer good, such as an article of clothing, components may be determined from a tag, a label, a data sheet (e.g., a material safety data sheet), or from any other source. Where the item is a machine, components may be determined from a set of specifications or operating instructions regarding the machine, or from any other source. Additionally, the sources of information or data from which components or attributes of items may be determined are not limited.

At box 340, a component profile is generated for the customer based on the components of the items determined at box 335. For example, the component profile may include a complete list or set of the components of the items associated with the customer profile determined at box 335 or, alternatively, a predetermined number of the highest-ranking or most predominant components or attributes among the items having fewer than all of the complete list or set of such components or attributes. The component profile may also include dates or times associated with the components or attributes of the items (e.g., foods consumed at breakfast, lunch or dinner, or clothing worn on weekdays or weekends), which may be identified on an annual or periodic basis (e.g., weekly, monthly or seasonally). Moreover, the component profile may include numbers or amounts associated with each of such components or attributes, and may also indicate whether such numbers or amounts approach or exceed one or more thresholds (e.g., a homeowner's maximum run-times of power tools such as lawn mowers, weed whackers or leaf blowers), or are otherwise determined to be qualitatively or quantitatively normal or abnormal. For example, if a customer consumes seven hundred twenty fluid ounces (720 oz.) of bottled water in a month, and one hundred twenty fluid ounces (120 oz.) of cough syrup including acetaminophen, dextromethorphan and doxylamine succinate in the month, the quantity of bottled water consumed may be designated as normal or ordinary, while the quantity of cough syrup and/or acetaminophen, dextromethorphan and doxylamine succinate may be indicated as abnormal or problematic. Any type of item, and components or attributes thereof, may be included in the component profile.

At box 345, a customer's interest in a type or a category of item is determined. The customer's interest may be determined on any basis. For example, the customer may enter a keyword corresponding to an item or the type or category of the item into a text box or other aspect of a search engine and/or online marketplace, or one or more other network sites, or may select a keyword corresponding to the item, or the type or category of the item. The customer may visit a location (or a vicinity of a location) commonly associated with the item or the type or category of the item (e.g., an ice cream shop or an Italian restaurant). The customer may also access one or more media associated with the type or category of item (e.g., audio or video files pertaining to the item that are aired, displayed or streamed within a vicinity of the customer). Additionally, the customer's interest in the item may be determined based on his or her interest in one or more complementary items, his or her interest in one or more substitutable items, or his or her interest in any other related items.

At box 350, information regarding items in the type or category is identified. For example, the information may be identified from any source, e.g., a look-up table or other record that may be maintained in one or more data stores. Such information may describe one or more intended uses of items in the type or category, handling instructions for such items, or any other operational restrictions on such items. At box 360, a procedure for preparing one of the items in the type or category is identified. In some embodiments, the procedure may be identified based on a measure of similarity between any information or data upon which the customer's interest in the type or category was determined. For example, where the customer enters a keyword of "guacamole" or "desk lamp" into a search engine, the information regarding the items in the type or category determined at box 350 may be parsed, processed or otherwise evaluated in order to identify an item that relates most closely to the keyword, and a procedure for preparing the item may be identified accordingly. Alternatively, one of the type or category of items including a maximum number of components or attributes that are known, determined or predicted to be preferred by the customer, or including a minimum number of components or attributes that are known, determined or predicted to be disfavored by the customer, may also be identified. The one of the items in the type or category may be identified on any other basis or factor, including but not limited to any intrinsic or extrinsic data (e.g., a location of the customer, a time of day, or a day of the week).

At box 370, one of the components listed in the component profile is selected. The component may be selected on any basis, including but not limited to its relation to the one of the items for which the preparation procedure was identified at box 360, or according to any other criteria. At box 380, the procedure is customized to include at least one step for preparing one of the items in the type or category with the selected component. For example, where the selected component is a substitute for one of the components that is ordinarily used to prepare the product according to the procedure, one or more steps or actions of the procedure may be customized to replace that component with the selected component. Alternatively, where the selected component is a complement to one or more of the components that are used to prepare the product according to the procedure, one or more steps or actions that would integrate or incorporate the selected component into the completed product may be added to the procedure. Any number of steps or actions may be added to, removed from or modified within the procedure in accordance with the present disclosure. At box 390, an item is prepared according to the customized procedure, and the process ends.

Alternatively, in some embodiments, one or more of components or attributes listed in a component profile may be selected prior to identifying the procedure for preparing one of the items in the type or category. In some such embodiments, a component or an attribute may be selected based on a specific personal preference of the customer, or to minimize either the total amount of the selected product that must be incorporated into the product, or the customization of the procedure that is required in order to incorporate the selected component into the item that is prepared according to the customized procedure, or on any other basis.

Additionally, customer profiles that are generated in accordance with the present disclosure may be updated or revised based on any information that may be known, determined or predicted regarding the customer over time. For example, as the customer's use of Internet-enabled computer devices changes over time (e.g., as the customer searches for or browses information of any type or form, accesses one or more network sites, visits one or more locations and/or purchases or contemplates purchasing one or more items), a profile of the customer and/or the customer's level of interest in a type or category of the item may be updated or revised accordingly.

Information or data regarding a customer's interest in one or more items may be aggregated and processed to identify specific components or attributes of such items that a customer prefers or disfavors. Instructions for preparing a customized product that includes one or more items preferred by the customer or excludes one or more items disfavored by the customer, or the customized product itself, may then be generated and marketed to the customer.

Figure 4A:
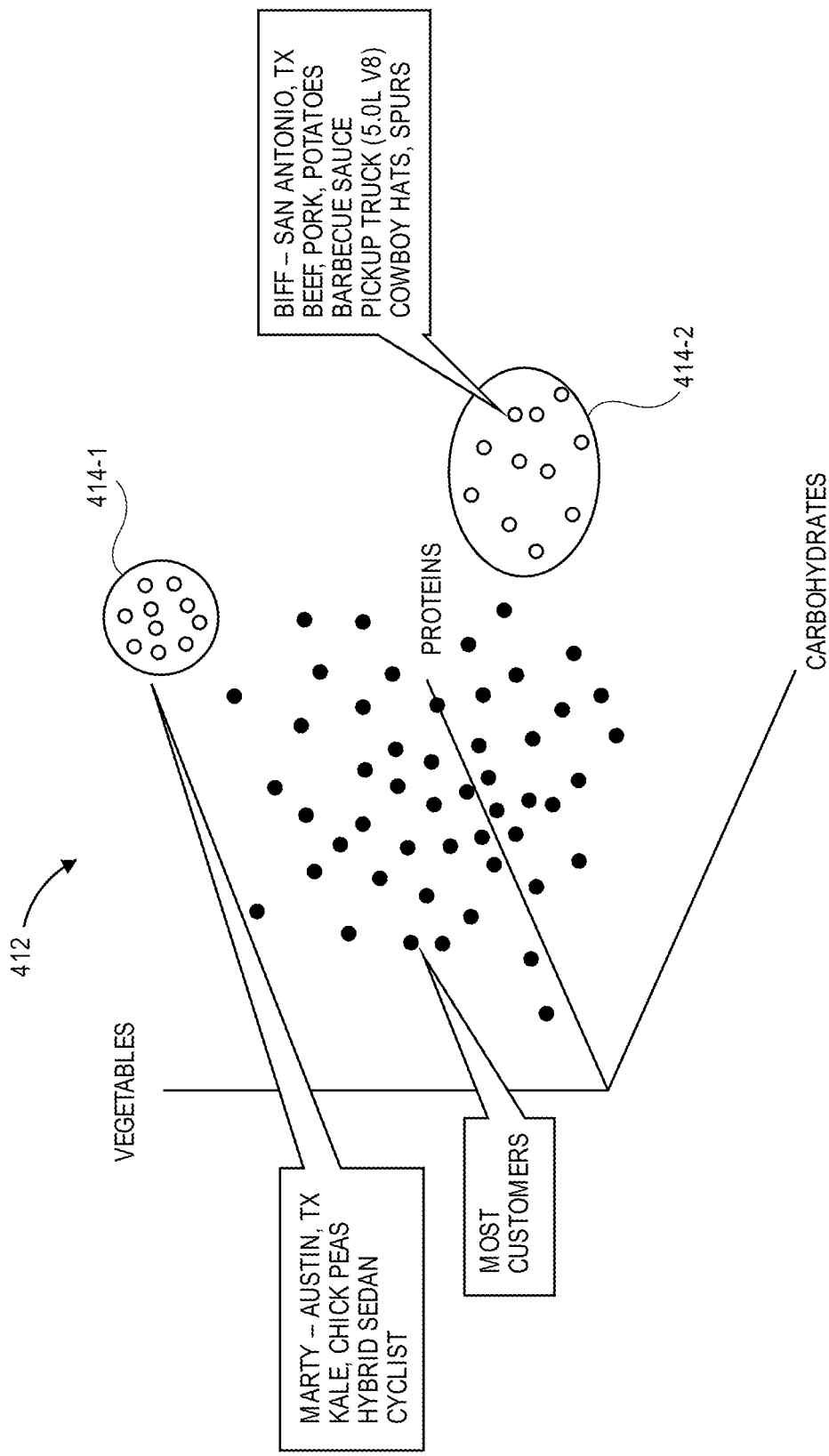

Referring to FIGS. 4A through 4C, views of aspects of systems for providing customized products based on customer behavior in accordance with embodiments of the present disclosure are shown. Except where otherwise noted, reference numerals preceded by the number "4" in FIG. 4A, FIG. 4B or FIG. 4C refer to elements that are similar to elements having reference numerals preceded by the number "2" in FIG. 2A or FIG. 2B or by the number "1" shown in FIGS. 1A through 1G.

As is shown in FIG. 4A, a scatter plot 412 of information regarding the nutritional content of foods purchased by customers is shown. The scatter plot 412 includes a plurality of points plotted with respect to the concentrations of carbohydrates, proteins and vegetables within such foods along x-, y- and z-axes. The scatter plot 412 also includes a pair of clusters 414-1, 414-2 of points indicative of foods purchased by two different customers. The cluster 414-1 includes points regarding foods purchased by a resident of Austin, Tex., who prefers foods such as kale and chick peas, drives a hybrid sedan, and prefers cycling. The cluster 414-2 includes points regarding foods purchased by a resident of San Antonio, Tex., who prefers foods such as beef, pork and potatoes, with barbecue sauce, drives a pickup truck and wears cowboy hats and spurs.

Some embodiments of the present disclosure may be used to identify and generate alternative versions of products (e.g., food products) that include components (e.g., food ingredients) or attributes (e.g., cooking styles) that are known, determined or predicted to be preferred by a customer, or that exclude components or attributes that are known, determined or predicted to be disfavored by the customer. As is shown in FIG. 4B, a mobile device 445B displays a network page 462B (or a page associated with a dedicated shopping application) that describes an offer for the purchase of a customized version of a food product (viz., a Southwest Burger having a tomato jalapeño sauce) that is offered to the resident of Austin whose food purchases are represented in the cluster 414-1 of FIG. 4A. For example, as is shown in FIG. 4B, because the cluster 414-1 of FIG. 4A indicates an expressed preference for high-protein and high-vegetable content foods, and because the cluster 414-1 implies a lack of interest in foods having high concentrations of carbohydrates, the network page 462B calls the customer out by name and offers the purchase of a Southwest Burger on a bed of kale and with a side of locally sourced succotash.

As is shown in FIG. 4C, a mobile device 445C displays a network page 462C (or a page associated with a dedicated shopping application) that describes an offer for the purchase of a customized version of the Southwest Burger that is offered to the resident of San Antonio whose food purchases are represented in the cluster 414-2 of FIG. 4A. For example, as is shown in FIG. 4C, because the cluster 414-2 of FIG. 4A indicates an expressed preference for high-carbohydrate and high-protein content foods, and because the cluster 414-2 implies a lack of interest in foods having high concentrations of vegetables, the network page 462C calls the customer out by name and offers the purchase of a Southwest Burger on Texas toast and served with wedge potatoes and a slice of sharp cheddar cheese.

Figure 5:
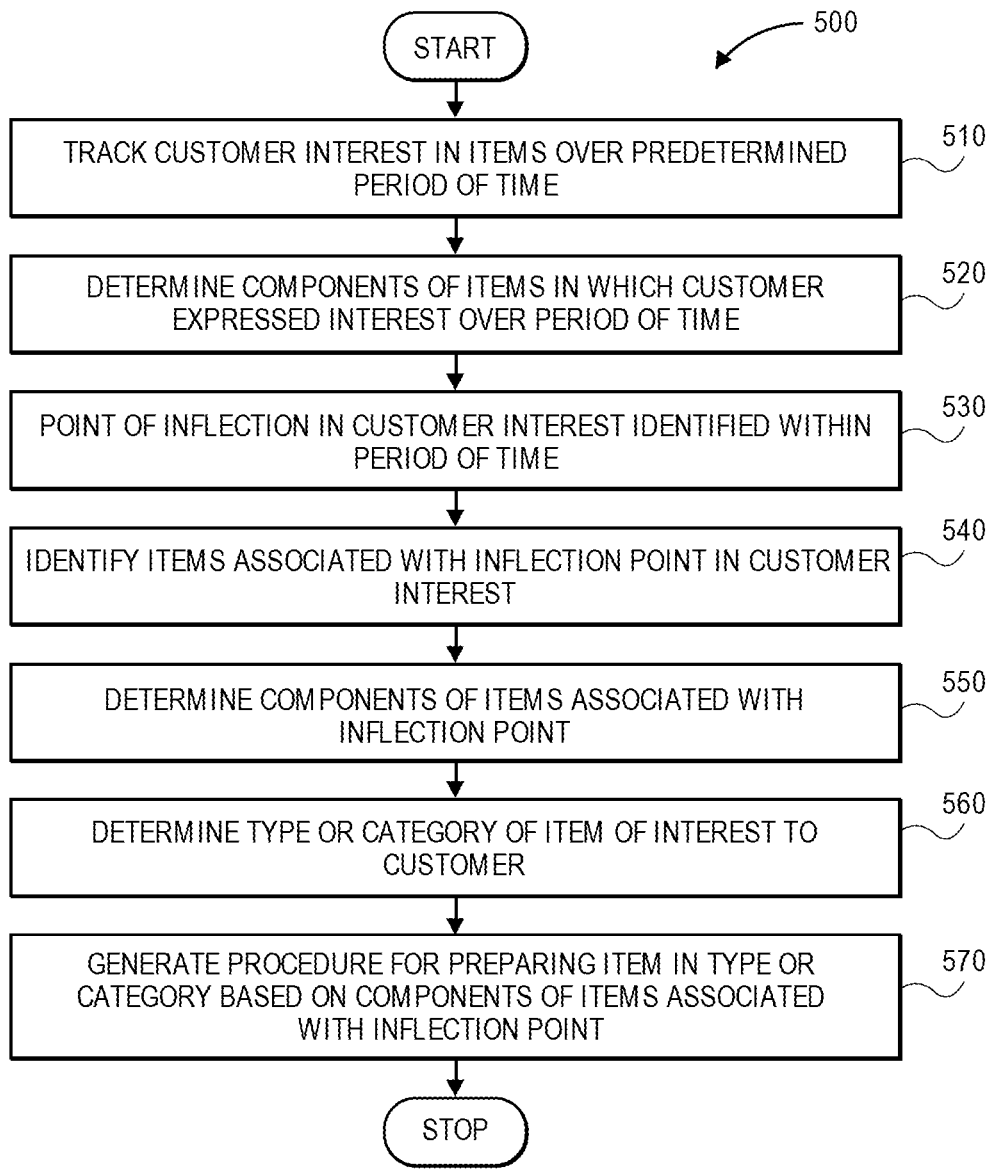
FIG. 5 is a flow chart of one process for providing customized products based on customer behavior in accordance with embodiments of the present disclosure.

Some embodiments of the present disclosure may identify one or more components or attributes that a customer prefers, or disfavors, based on changes in his or her interest in items having such components or attributes determined from the customer's use of an Internet-enabled computer device over time. Referring to FIG. 5, a flow chart 500 of one process for preparing customized products based on customer behavior in accordance with embodiments of the present disclosure is shown. At box 510, a customer's interest in one or more items is tracked over a predetermined period of time, e.g., based at least in part on his or her interactions with one or more computer devices. The customer's use of a mobile device to access one or more network sites, e.g., a blog, a social network, or an online marketplace, may be tracked over time and associated with one or more items. For example, where the customer views information or data regarding one or more items that is provided at one or more network sites, uses a computer device to purchase or consider purchasing one or more items, or travels to one or more locations that may be associated with one or more items, the customer may be deemed to have an interest in such items, or in one or more substitutable items, complementary items or items that are otherwise related to such items in any way.

At box 520, the components of the items in which the customer has expressed interest over the predetermined period of time are determined. Information or data regarding such components may be determined from any source and in any manner. For example, where the customer is interested in a television, information or data regarding various attributes of the television, e.g., screen dimensions, pixel densities, heights, weights, compatibility with set-top boxes and/or cable television systems or wall mounts, or any other information or data, may be determined. Where the customer is interested in a food product, information or data regarding various attributes of the food product, e.g., nutrition facts, serving sizes, amounts of fats, cholesterol, carbohydrates, proteins, vitamins or minerals, as well as a source of the food product (such as a farm, a factory or a country of origin), and masses or volumes of the food product consumed by the customer, or any other information or data, may be determined. Where the customer is interested in an automobile, information or data regarding various attributes of the automobile, e.g., vehicle dimensions, engine ratings, fuel (such as gasoline, diesel or electric), numbers of tires, cargo capacities, accessories, or peripherals, as well as a source of the automobile (such as a specific brand, dealer, factory or country of origin), or any other information or data, may be determined.

At box 530, a point of inflection in the customer interest identified within the predetermined period of time is identified. For example, a change in a level of the customer's interest, i.e., an increase or a decrease, may be recognized based on changes or trends in rates, times or frequencies with which the customer accesses information regarding a particular item, purchases the item or considers purchasing the item, or on any other factor. At box 540, the one or more items associated with the inflection point in the customer's interest are identified. For example, where a customer is determined to have varying levels of interest in a number of items, the specific items associated with the point of inflection identified at box 530 may be identified. In some embodiments, when a customer participates in a workout regimen, begins a diet or embarks on a trip to one or more locations, or ends the workout regimen, terminates the diet or returns from the trip, such actions may be evident in view of increasing or decreasing levels of interest in one or more items (e.g., sneakers, supplements, travel shampoo, candy), which may deviate from changes in levels of interest in one or more other items that are not related to workout regimens, diets or trips. At box 550, the components of the one or more items that are identified as associated with the inflection point are determined from any source, e.g., a look-up table or other record that may be maintained in one or more data stores. Such components may be determined to correspond with the increase or the decrease in the customer interest on any basis, e.g., as a proportion or ratio of the overall composition of such items, or the mere presence of such components within such items, or in any other manner.

At box 560, a type or a category of item of interest to the customer is identified. The type or category of the item may be identified based on an entry of a keyword or a selection of a category (e.g., "facial lotions" or "chai tea") by the customer, or in any other manner. At box 570, a procedure for preparing an item in the type or the category is generated based on the components of the items that were associated with the inflection point, and the process ends. For example, where a specific component or attribute is determined to correspond with an increase in a customer's interest, the generated procedure for preparing the item in the type or the category may include the specific component or attribute. Where a specific component or attribute is determined to correspond with a decrease in a customer's interest, however, the generated procedure for preparing the item in the type or the category may include the specific component or attribute.

Figure 6:
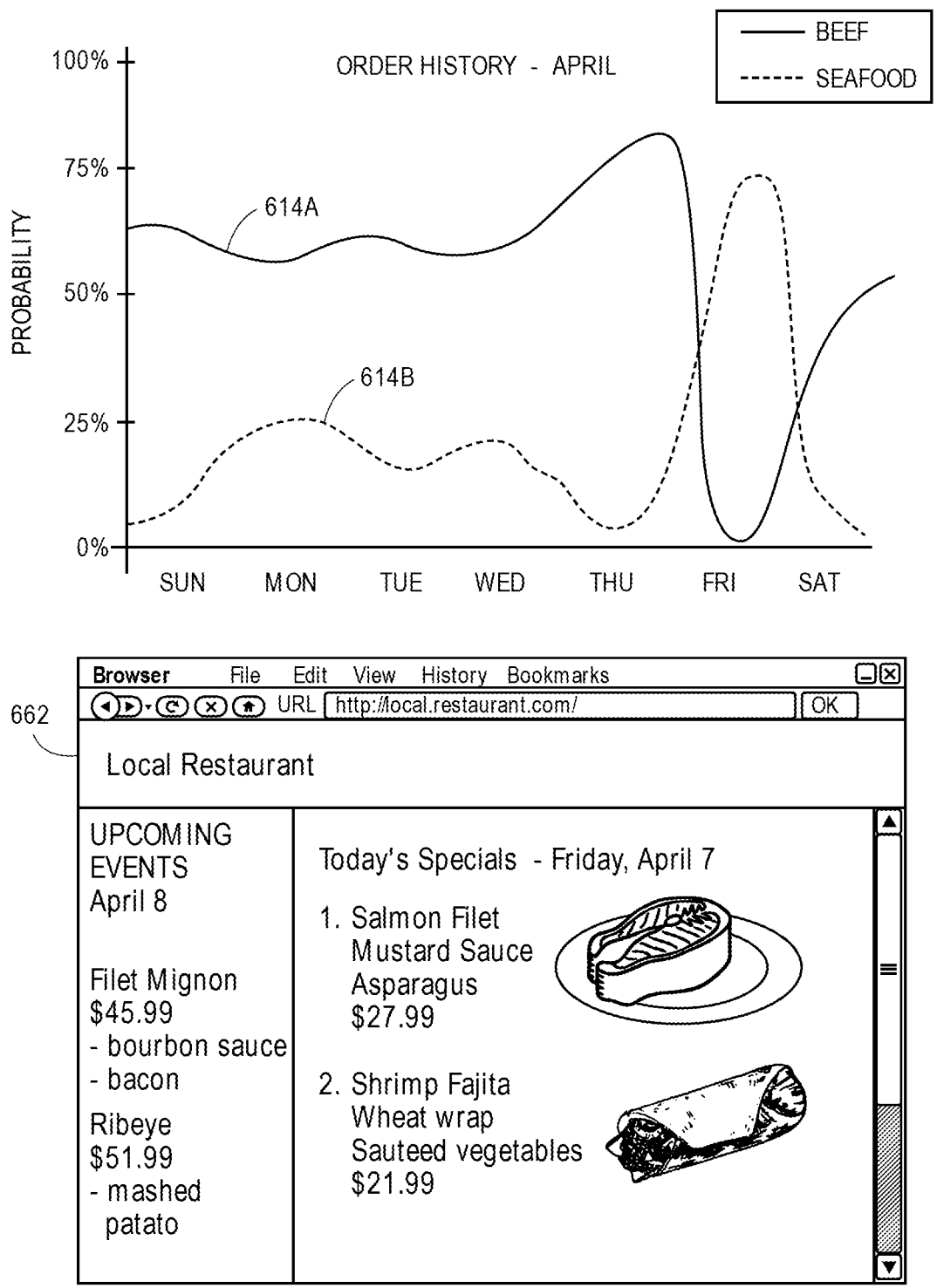
FIG. 6 is a view of aspects of one system for providing customized products based on customer behavior in accordance with embodiments of the present disclosure.

A component or an attribute may be identified as preferred by one or more customers, or disfavored by one or more customers, as a function of time, and may be based on one or more intrinsic factors, events, conditions or situations of the customers, or on one or more extrinsic factors, events, conditions or scenarios affecting the customers in any way. Referring to FIG. 6, a view of aspects of one system for providing customized products based on customer behavior in accordance with embodiments of the present disclosure is shown. Except where otherwise noted, reference numerals preceded by the number "6" in FIG. 6 refer to elements that are similar to elements having reference numerals preceded by the number "4" in FIG. 4A, FIG. 4B or FIG. 4C, by the number "2" in FIG. 2A or FIG. 2B or by the number "1" shown in FIGS. 1A through 1G.

As is shown in FIG. 6, probabilities concerning components or attributes of observed order histories are plotted over time with respect to days of a week over the month of April. The plot of FIG. 6 includes a representation of a probability 614A that an item ordered by customers will include beef, and a representation of a probability 614B that an item ordered by customers will include seafood. As is shown in FIG. 6, the probability 614A is slightly more than average (e.g., fifty percent, or 50%) for the days of Sunday through Wednesday before reaching an absolute peak of approximately eighty percent (80%) on Thursday and falling to an absolute minimum of approximately zero percent (0%) on Friday and returning to an approximately average probability on Saturday. As is also shown in FIG. 6, the probability 614B is below twenty-five percent (25%) for most days of Sunday through Wednesday and is nearly zero percent (0%) on Thursday before climbing to an absolute peak of approximately seventy percent (70%) on Friday and returning to approximately zero percent (0%) again on Saturday. Therefore, the probabilities 614A, 614B indicate that items including beef are clearly preferred on Sundays through Thursdays and Saturdays, but clearly disfavored on Fridays, and that items including seafood are not strongly favored on Sundays through Thursdays or Saturdays but are strongly favored on Fridays.

In accordance with one or more embodiments of the present disclosure, procedures for preparing one or more items (e.g., recipes for preparing food products) may be customized to include or exclude components or attributes that are known, determined or predicted to be preferred or disfavored, respectively, by one or more customers. Modifications to such procedures may be based on any qualitative or quantitative information or data, such as the probabilities 614A, 614B of FIG. 6, regarding components or attributes that are preferred or disfavored by one or more customers. As is shown in FIG. 6, a user interface 662 includes a page displaying a pair of offers of items (e.g., entrées) that feature seafood and do not include beef. The entrées may be prepared according to procedures in which one or more seafood ingredients are substituted for one or more beef ingredients. For example, as is shown in FIG. 6, one of the entrées is a salmon filet accompanied by a mustard sauce and asparagus, which may be prepared according to a procedure for cooking filet mignon that has been customized to include salmon as a substitute for filet mignon. Additionally, as is also shown in FIG. 6, another of the entrées is a shrimp fajita having a wheat wrap and sautéed vegetables, which may be prepared according to a procedure for cooking steak fajitas that has been customized to include shrimp as a substitute for steak. Such procedures may be customized in any manner that may be required in order to effectuate a substitution of one ingredient for another, such as by modifying any cooking times, temperatures or procedures (e.g., baking versus frying), or any other prefatory steps (e.g., marinating, cutting, cleaning) that may be necessary in order to properly prepare an entrée according to the customized procedure.

Additionally, a customized procedure, or a customized product prepared according to such a procedure, may be presented to one or more customers in any manner. For example, as is shown in FIG. 6, the customized product may be shown or described in a page rendered by a browser or other application having one or more user interfaces. Alternatively, the customized procedure or the customized product may be shown or described in an electronic message, on a billboard or in a menu presented to one or more customers in general, or to one or more specifically selected customers. The manner in which a procedure or a product that has been modified based on a customer's interest in one or more components or attributes of items is presented to the customer is not limited to any one of the embodiments described herein.

Furthermore, although FIG. 6 indicates probabilities 614A, 614B that an item ordered by a customer will include beef or seafood, respectively, as determined based on order histories, those of ordinary skill in the pertinent arts will recognize that a level of interest in a given component or attribute may be determined on any basis and based on information or data obtained from any source, and a customer profile (e.g., a gastronomic profile) may be generated or updated accordingly. For example, probabilities that an item ordered by a customer will include a given component (e.g., beef or seafood) or attribute may be determined based on search histories or browsing histories, such as whether the customer has accessed any specific network pages (such as blogs, social networks or news or sports sites) that describe or relate to beef or seafood, respectively, or any other interaction by the customer with one or more computer devices, including but not limited to Internet-enabled computer devices. Alternatively, probabilities that an item ordered by a customer will include a given component or attribute may be determined based on locations visited by the customer. For example, where a customer is determined to have visited or spent a substantial amount of time near beaches, riverfronts, fish markets or any other locations or facilities where seafood is commonly prepared or sold, the customer may be deemed more likely to prefer seafood. Where a customer is determined to have visited or spent a substantial amount of time near farms, campsites, butcher shops or any other locations or facilities where beef is commonly prepared or sold, the customer may be deemed more likely to prefer beef. The number or types of sources of information or data upon which determinations that a customer prefers or disfavors a given component are likewise not limited to any one of the embodiments described herein.

Moreover, modifications to procedures for preparing one or more items may be modified in any manner to accommodate components or attributes that are known to be preferred or disfavored by a customer. For example, in some embodiments, a procedure for preparing an item may be modified to substitute a component that a customer is known, determined or predicted to prefer for another component that the customer is known, determined or predicted to disfavor, such as is shown in FIG. 6. Alternatively, in some embodiments, a procedure for preparing an item may be modified to call for the addition of a component that a customer is known, determined or predicted to prefer, without calling for the removal of any components or attributes therefrom, or to call for the removal of a component that the customer is known, determined or predicted to disfavor, without calling for the addition of any components or attributes thereto. In some other embodiments, a procedure for preparing an item may also be modified to require increasing or decreasing an amount or a concentration of any given component, as well.

As is discussed above, a customer profile may include records, data or labels regarding components or attributes of items that a customer has purchased or expressed an interest in purchasing, and the customer's interest in such components or attributes may be known, determined or predicted based on such items (e.g., a number or a frequency of purchases of items that include a given component, or an amount or a concentration of the given component in such items). Alternatively, a customer's lack of interest in one or more components or attributes of items may be known, determined or predicted based on a customer's failure to purchase any items that include such components or attributes, or where the customer's purchases of such items is comparatively low in number or frequency as compared to his or her purchases of items having other components or attributes.

Referring to FIG. 7, a view of aspects of one system for providing customized products based on customer behavior in accordance with embodiments of the present disclosure is shown. Except where otherwise noted, reference numerals preceded by the number "7" in FIG. 7 refer to elements that are similar to elements having reference numerals preceded by the number "6" in FIG. 6, by the number "4" in FIG. 4A, FIG. 4B or FIG. 4C, by the number "2" in FIG. 2A or FIG. 2B or by the number "1" shown in FIGS. 1A through 1G.

As is shown in FIG. 7, a component profile 714 (e.g., a gastronomic profile) includes a plurality of components (e.g., ingredients) purchased by a customer over a prior period of time. For example, the component profile 714 indicates total amounts of components that were purchased by the customer over a previous twelve-month period, as well as average, peak and minimum amounts of such components that were purchased on a monthly basis over the prior twelve months. For example, the component profile 714 indicates that the customer has purchased items having substantial amounts of chocolates (e.g., milk chocolates and dark chocolates), including nearly eighteen pounds (or 8,042 grams) of milk chocolate and approximately twelve pounds (or 5,444 grams) of dark chocolate over the previous twelve months. The component profile 714 also indicates that the customer has not purchased any items having peanuts or peanut butter over the previous twelve months. Moreover, the component profile 714 further indicates that the customer has purchased a number of items that are known to lack any peanuts or peanut butter, viz., cereals, raisins, cheese crackers and fruit cups, as well as a number of items that may be used as substitutes for peanuts or peanut butter in cooking, viz., sunflower oil, sunflower seeds, chick peas, soybeans or pretzels.

Therefore, based on information regarding the known purchases made by the customer, as expressed in the component profile 714, one or more embodiments of the present disclosure may determine or predict that the customer prefers products that include chocolates, or that the customer has some aversion toward products that include peanuts. For example, the customer may be allergic to peanuts, or may not like the taste of peanuts. Upon determining or predicting that the customer prefers chocolates, and disfavors peanuts, a procedure for preparing an item (e.g., peanut butter cups) may be modified to remove peanut components such as peanut butter therefrom and/or to incorporate one or more substitutes for peanuts or peanut components (e.g., soy butter) therein, resulting in a product that is customized in a manner consistent with the customer's observed behavior. As is shown in FIG. 7, an electronic message 768 including an offer of the customized product may be generated and transmitted to the customer. The electronic message may describe features of the customized product, and may include an indication that the customized product includes one or more components that are known, determined or predicted to be favored by the customer (e.g., chocolates, soybeans). The electronic message may also include one or more other attributes of the customized product (e.g., prices, nutrition data) as well as one or more links or other features for purchasing the customized product, or for obtaining additional information regarding the customized product.

Figure 8A:
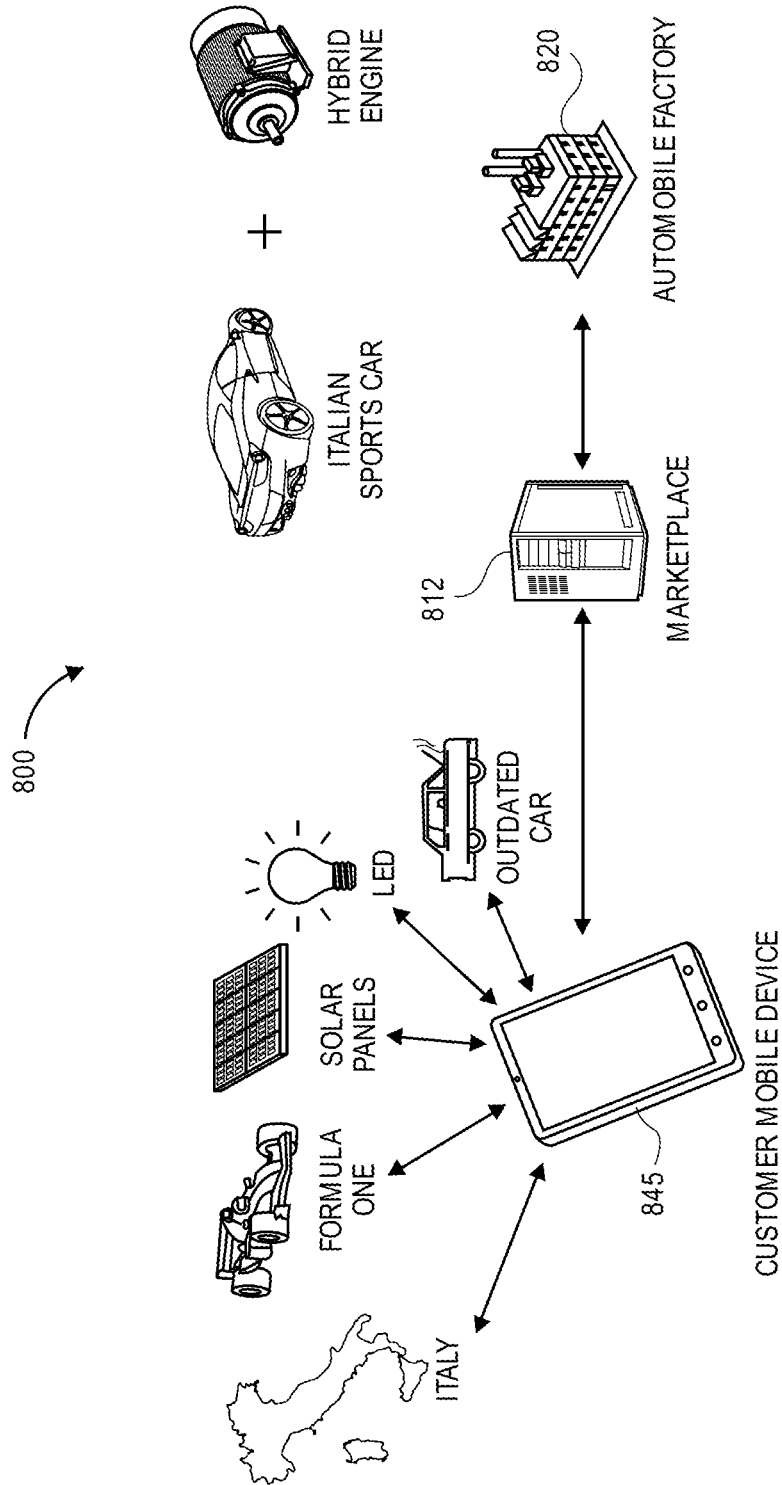
FIGS. 8A through 8C are views of aspects of one system for providing customized products based on customer behavior in accordance with embodiments of the present disclosure.
Figure 8C:
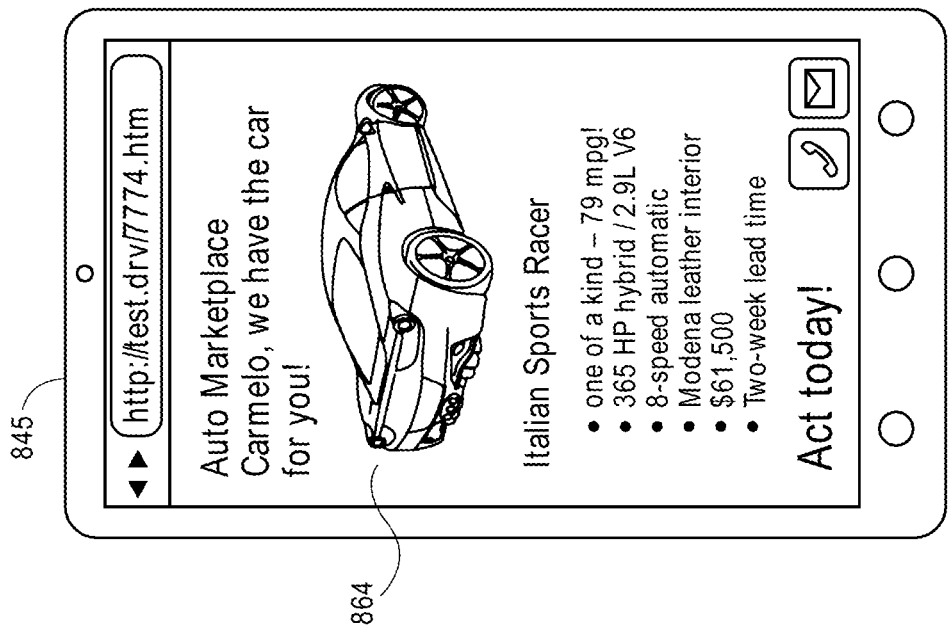
Figure 8B:
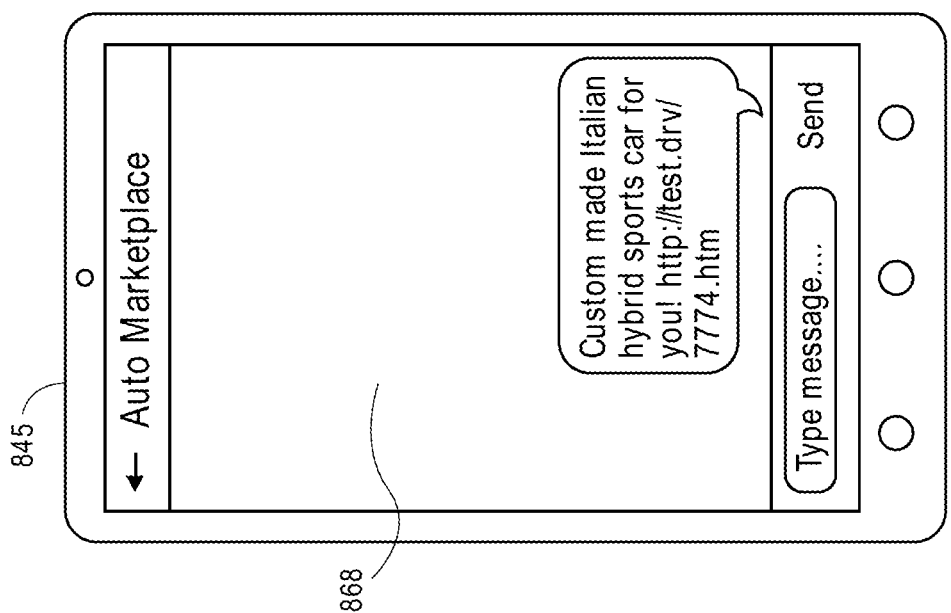

A customer's level of interest in items having one or more components or attributes may be determined based on any information or data that may be known, determined or predicted regarding the customer, including but not limited to information or data that may be accessed or obtained based on the customer's interactions with one or more computer devices. Referring to FIGS. 8A through 8C, views of aspects of one system for providing customized products based on customer behavior in accordance with embodiments of the present disclosure are shown. Except where otherwise noted, reference numerals preceded by the number "8" in FIG. 8A, FIG. 8B or FIG. 8C refer to elements that are similar to elements having reference numerals preceded by the number "7" in FIG. 7, by the number "6" in FIG. 6, by the number "4" in FIG. 4A, FIG. 4B or FIG. 4C, by the number "2" in FIG. 2A or FIG. 2B or by the number "1" shown in FIGS. 1A through 1G.

As is shown in FIG. 8A, information or data associated with a mobile device 845 of a customer may indicate that the customer has interest in Italy, Formula One racing, solar panels, and light emitting diode (LED) lights, or that the customer owns an outdated automobile. For example, one or more caches or other records maintained on the mobile device 845 may indicate that the customer has visited a number of network sites (e.g., blogs, social networks, or news or sports sites) regarding travel to Italy, Italian food, Italian politics or any people, events or occurrences that may be associated with Italy. Similarly, such caches or records may indicate that the customer has viewed one or more Formula One racing events on the mobile device 845 (e.g., by streaming video), or that the customer has searched for Formula One schedules or standings using the mobile device 845. Moreover, the caches or records may indicate that the customer has visited sites regarding energy efficiency (e.g., whether his or her home is properly positioned for the construction of solar panels thereon, or is eligible for one or more tax credits for lighting upgrades), or that the customer owns an automobile of a specific age, model or condition. Likewise, a purchasing history of the customer maintained at a server 812 of an online marketplace may indicate that the customer has purchased any number of items related to Italy, Formula One racing, or efficient energy systems (e.g., solar panels and/or LED lighting), as well as repair parts or manuals for an automobile in a specific age, model or condition using the mobile device 845 or any other computer device. A position record maintained on the mobile device 845 or elsewhere may indicate that the customer has traveled to Italy, dined at Italian restaurants, attended a Formula One race or participated in an energy efficiency convention. Any other information or data that may be captured or accessed by the mobile device 845, including but not limited to one or more audio, video or other files may be utilized to determine or predict a level of interest of a customer in one or more items in accordance with the present disclosure.

In accordance with the present disclosure, one or more components or attributes may be identified as preferred by a customer, or as disfavored by the customer, based on any information or data that may be known, determined or predicted regarding the customer's interests, including but not limited to information or data obtained based at least in part on the use of a computer device, such as the mobile device 845, and a customer profile that includes the information or data may be generated and stored in one or more data stores, e.g., a data store associated with the marketplace server 812. Based on information or data in the customer profile, a customized automobile that includes one of the components or attributes that is preferred by the customer, or excludes one of the components or attributes that is disfavored by the customer, may be conceived and offered to the customer. For example, given the customer's interest in Italy and Formula One racing, as well as the fact that the customer owns an outdated automobile, an Italian sports car may be recommended to the customer. However, given the customer's interest in energy efficiency, an Italian sports car that includes an energy efficient engine, e.g., a hybrid engine, may be conceived in cooperation with an automobile factory 820. For example, plans for manufacturing an Italian sports car may be modified to include a hybrid engine, rather than a gasoline-powered or diesel-powered engine, having any specifications or ratings that may be known, determined or predicted to be preferred by the customer. A cost estimate for customizing the Italian sports car to include the hybrid engine may be generated, and an electronic advertisement for the customized automobile may be presented to the customer in any manner.

For example, as is shown in FIG. 8B, an electronic message 868 (e.g., a SMS text message, an MMS text message, a social network message or the like) including a hyperlink to a details page regarding the customized automobile may be transmitted to the mobile device 845. As is shown in FIG. 8C, upon a selection of the hyperlink, a details page 864 identifying the features of the customized automobile is displayed on the mobile device 845. The details page 864 includes specifications regarding the customized automobile, as well as one or more images and links enabling the customer to contact the marketplace 812 or the automobile factory 820 for more information or to order the customized automobile.

Figure 9A:
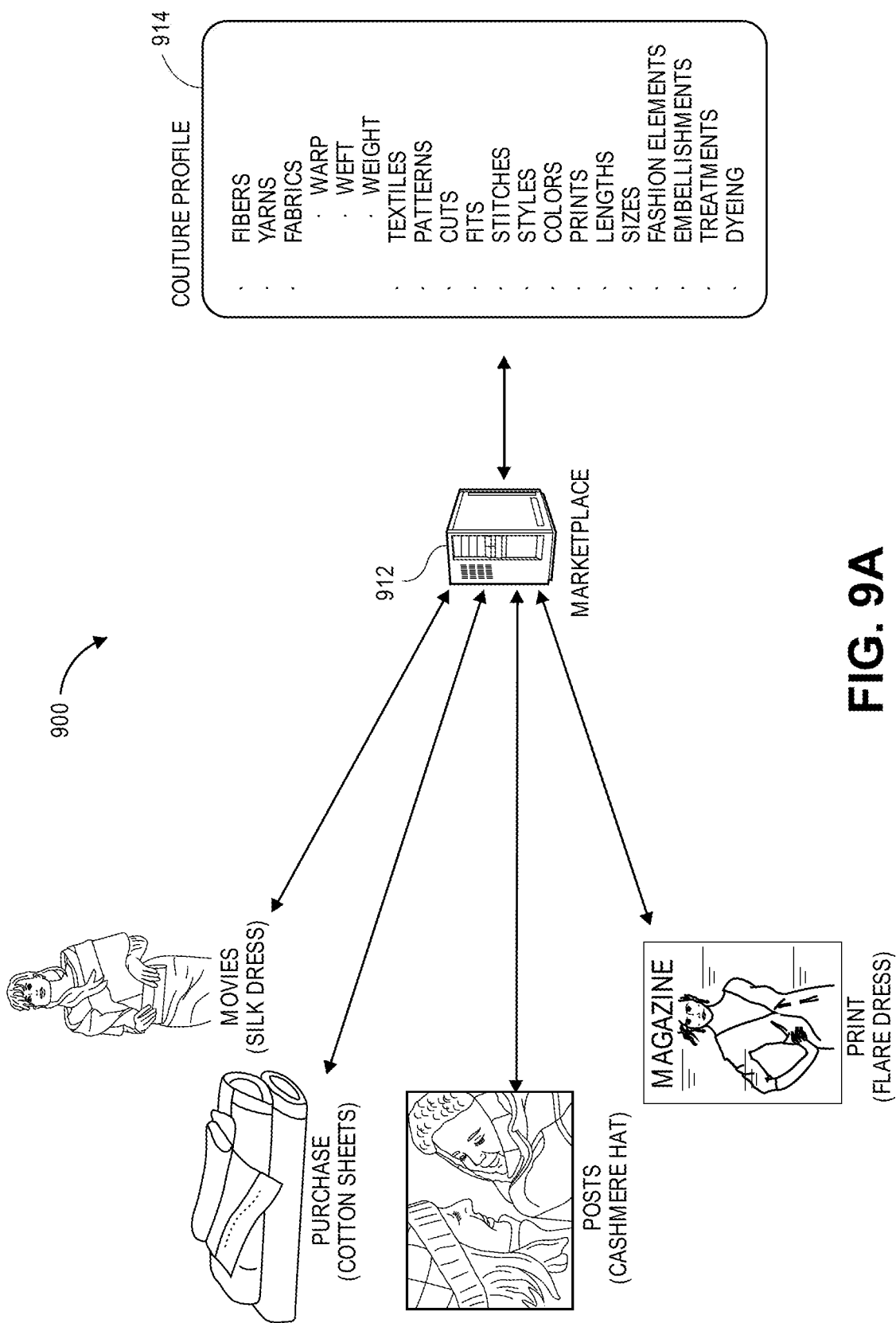
FIGS. 9A through 9B are views of aspects of one system for providing customized products based on customer behavior in accordance with embodiments of the present disclosure.
Figure 9B:
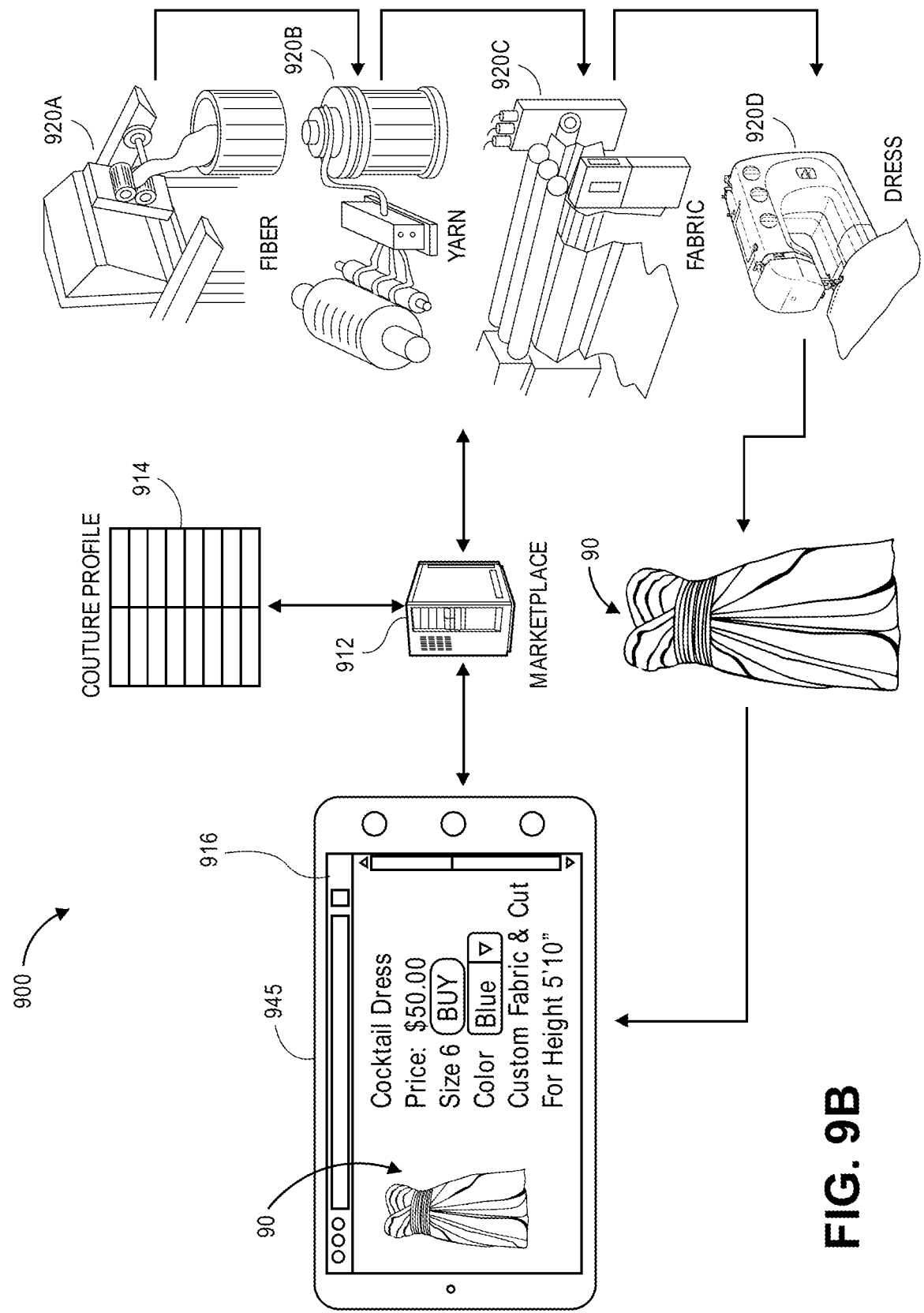

The systems and methods of the present disclosure may be utilized to conceive any type of customized product, or to generate any instructions for preparing a customized product, and are not limited to conceiving customized foods or machines. For example, in some embodiments, the systems and methods disclosed herein may be used to customize clothing based on components (e.g., materials or other features) or attributes (e.g., styles or cuts) that a customer is known to prefer or disfavor. Information or data regarding such components or attributes may be determined from any source and processed in any manner. Referring to FIGS. 9A and 9B, a view of aspects of one system for providing customized products based on customer behavior in accordance with embodiments of the present disclosure is shown. Except where otherwise noted, reference numerals preceded by the number "9" in FIGS. 9A and 9B refer to elements that are similar to elements having reference numerals preceded by the number "8" in FIG. 8A, FIG. 8B or FIG. 8C, by the number "7" in FIG. 7, by the number "6" in FIG. 6, by the number "4" in FIG. 4A, FIG. 4B or FIG. 4C, by the number "2" in FIG. 2A or FIG. 2B or by the number "1" shown in FIGS. 1A through 1G.

The system 900 includes a marketplace server 912 having one or more couture profiles stored thereon. The marketplace server 912 is in communication with a mobile device 945 of a customer over a network (e.g., a wired or wireless network including the Internet in whole or in part), and also with a number of vendor systems 920A, 920B, 920C, 920D. In accordance with some embodiments of the present disclosure, information or data regarding a customer's behavior may be obtained from any number of sources. For example, a marketplace server 912 may determine that a customer has watched "The Tourist," a 2010 movie starring Angelina Jolie, in which Ms. Jolie is depicted wearing a cream silk dress with a mocha wrap and gloves, several times via streaming video. The marketplace server 912 may then determine information or data regarding colors, textures, fabrics, dimensions, shapes, cuts or other features of the cream silk dress, the mocha wrap and/or the gloves from an analysis of one or more of the video frames of the movie. The marketplace server 912 may also determine that the customer has purchased one thousand-count single-ply Egyptian cotton sheets from the marketplace, and access material data such as colors, textures, fabrics, dimensions, shapes, cuts or other features stored thereon. The marketplace server 912 may recognize that the customer has posted one or more images to social media accounts depicting the customer wearing a baby blue cashmere hat, and may extract information or data regarding colors, textures, fabrics, dimensions, shapes, cuts or other features of the cream silk dress, the mocha wrap and/or the gloves from an analysis of one or more of the images. The marketplace server 912 may further determine that the customer has viewed a magazine or other media showing or featuring a size-six flare dress, and may determine information or data regarding colors, textures, fabrics, dimensions, shapes, cuts or other features of the cream silk dress, the mocha wrap and/or the gloves from analyses of any images included in the magazine or other media, or of any text-based descriptions included therein.

Based on such information or data, and in accordance with the present disclosure, a couture profile 914 may be generated for the customer. The couture profile 914 may include information or data regarding fibers or yarns (e.g., animal-based fibers or yarns such as silk, cashmere or wool, plant-based fibers or yarns such as cotton, hemp or bamboo, or synthetic fibers such as nylon, polyester, rayon or the like) preferred by the customer, including their warp and weft, or weight. In woven fabrics, the term "weave" refers to a manner in which threads of fibers known as a warp (e.g., a set of threads held in tension in a lengthwise manner within a frame or a loom) and a weft, or a "woof" (e.g., threads that are drawn through warp threads), are combined in order to create a fabric. For example, cotton fibers may be woven according to one or more different techniques in order to create different fabrics such as poplins, zephyrs, twills, oxfords, dobbies, jacquards, piquets or fil-à-fils, each of which may feature different properties. A single fiber may be used to form multiple fabrics, each of which may be very different from one another. For example, cotton can be used to form flannel, felt, denim, damask, corduroy, chambray, canvas, calico, batiste, or, generally, woven fabric. In addition to cotton, many other fibers may also be woven into fabric, including linen, acetate, angora, wool, cashmere, silk, alpaca, argyle, jute, acrylic, camel hair, leather, bamboo, spandex, rayon or lyocell.

Additionally, the couture profile 914 may further include information or data regarding specific textiles, patterns (e.g., argyle, camouflage, checker, chevron, damask, floral, gingham, houndstooth, lattice, palmette, paisley, plaid, polka dot, stripes), cuts or fits (e.g., A-line, ballerina neckline, basque waist, bell sleeve, bias cut, boat neck, buti, cinched waists, cowl necks, crew necks, darts, décolletés, dolman sleeves, drapes, dropped waists, empire waists, eyelets, gussets, hems, hook-and-eye closures, inseams, keyhole necks, lapels, natural waists, picot cuts, pin-tuck pleats, pipings, plackets, pleats, pointelles, princess seams, purl stitches, rises, scalloping, scoop necks, seams, selvedges, shawl collars, shirred waists, slim fit cuts, smockings, spaghetti straps, split necks, square necks, stances, tiers, topstitching, tucks, V-neck cuts, whiskers, wing collars, or others) or articles (e.g., Bolero jackets, bodices, boot-cut pants, broomsticks, camisoles, cap sleeves, capri pants, cardigans, cargo shorts or pants, carpenter pants, cigarette pants, double-breasted coats, dusters, French cuff shirts, halter tops, hip huggers, kimonos, maillots, mermaid dresses, plissés, pencil skirts, rompers, ruchings, sheaths, shrugs, skorts, sportswear, straight-leg pants, tank tops, tea-length skirts or dresses, trapeze tops, trumpet skirts, tunics, unitards, wide leg pants, wrap tops) that are preferred by the customer.

The couture profile 914 may also include information or data regarding specific styles (e.g., artsy, bohemian, business, casual, elegant, exotic, gothic, periods including one or more decade-based styles, preppy, rocker, sporty, tomboy, trendy, vibrant), colors, prints, lengths, sizes (which may be determined based on a purchasing history of the customer, or dimensions such as heights, weights, lengths or widths of the customer) or fashion elements preferred by the customer. The couture profile 914 may also include information or data regarding embellishments (e.g., appliques, beads, belts, braids, brooches, buckles, buttons, feathers, fasteners, hook-and-loop closures, pins, pockets, ribbons, trimmings, zippers), treatments (e.g., anti-bacterial, anti-stain, waterproofing, fire retardant treatments) or dyes (e.g., acid dyes, aniline dyes, anthraquinone dyes, azo dyes, cationic dyes, developed dyes, dispersed dyes, gel dyes, macromolecular dyes, metallized or pre-metallized dyes, mordant dyes, napthol dyes, natural dyes, pigment dyes, reactive dyes, substantive dyes, sulfur dyes, synthetic dyes or vat dyes) preferred by the customer. Any relevant information or data that may be obtained regarding aspects of clothing that the customer prefers or disfavors may be included in the couture profile 914 in accordance with the present disclosure.

In accordance with the present disclosure, based on information or data included in the couture profile 914, a custom-made article of clothing (e.g., a dress 90) that does not yet exist in the fashion world may be conceived by the marketplace server 912 or one or more other computer devices associated with an electronic marketplace. The design and assembly of the article of clothing may be generated digitally by the marketplace server 912 and presented to the customer before the article of clothing is actually ordered for assembly, after the article of clothing has been purchased. Alternatively, the article of clothing, or a sample thereof, may be generated by an automated loom, an electric loom (e.g., a 3D printing loom) or another device that may manufacture the article of clothing from one or more raw fibers.

For example, referring to FIG. 9B, a design of the dress 90 may be conceived by the marketplace server 912 and presented to a customer via one or more network pages 916 that may be transmitted to and rendered by a mobile device (or other computer device) 945 over a network. Aspects of the dress 90 may be selected based on aspects of clothing that the customer is determined to prefer or disfavor, based on the couture profile 914. If the customer orders the dress 90 via the network page 916 or in any other manner, the marketplace server 912 may then coordinate with one or more vendors 920A, 920B, 920C, 920D to ensure that the dress 90 is manufactured and delivered to the customer. For example, the marketplace server may direct a fiber vendor 920A to generate animal-based, plant-based or synthetic fibers, which may then be provided to a yarn vendor 920B and manufactured into yarns. Subsequently, the yarns may be provided to a fabric vendor 920C, which may weave or form the yarns into one or more fabrics, which may then be provided to a dress vendor 920D and stitched or otherwise formed into the dress 90. Once the dress 90 is complete, the dress 90 may be delivered to the customer.

Accordingly, some embodiments of the systems and methods of the present disclosure may conceive articles of clothing in selected fabrics or with selected features based on any information or data that may be known or predicted regarding a customer, and offer the articles of clothing to the customer. The articles of clothing may be of specific styles, or may feature specific cuts or colors that are believed to be most desired by a customer, or by other customers having one or more attributes in common with the customer, e.g., a geographic location, a cultural attitude, a level of affluence, an interest in trends, an affinity for brands, a predilection for colors, or an eclectic preference, each of which may be reliably predicted based on customer behavior as determined using one or more computer devices. Such preferences or attributes may not presently be predicted from demographic data, surveys or other methods, with any valuable degree of accuracy or precision.

Figure 10:
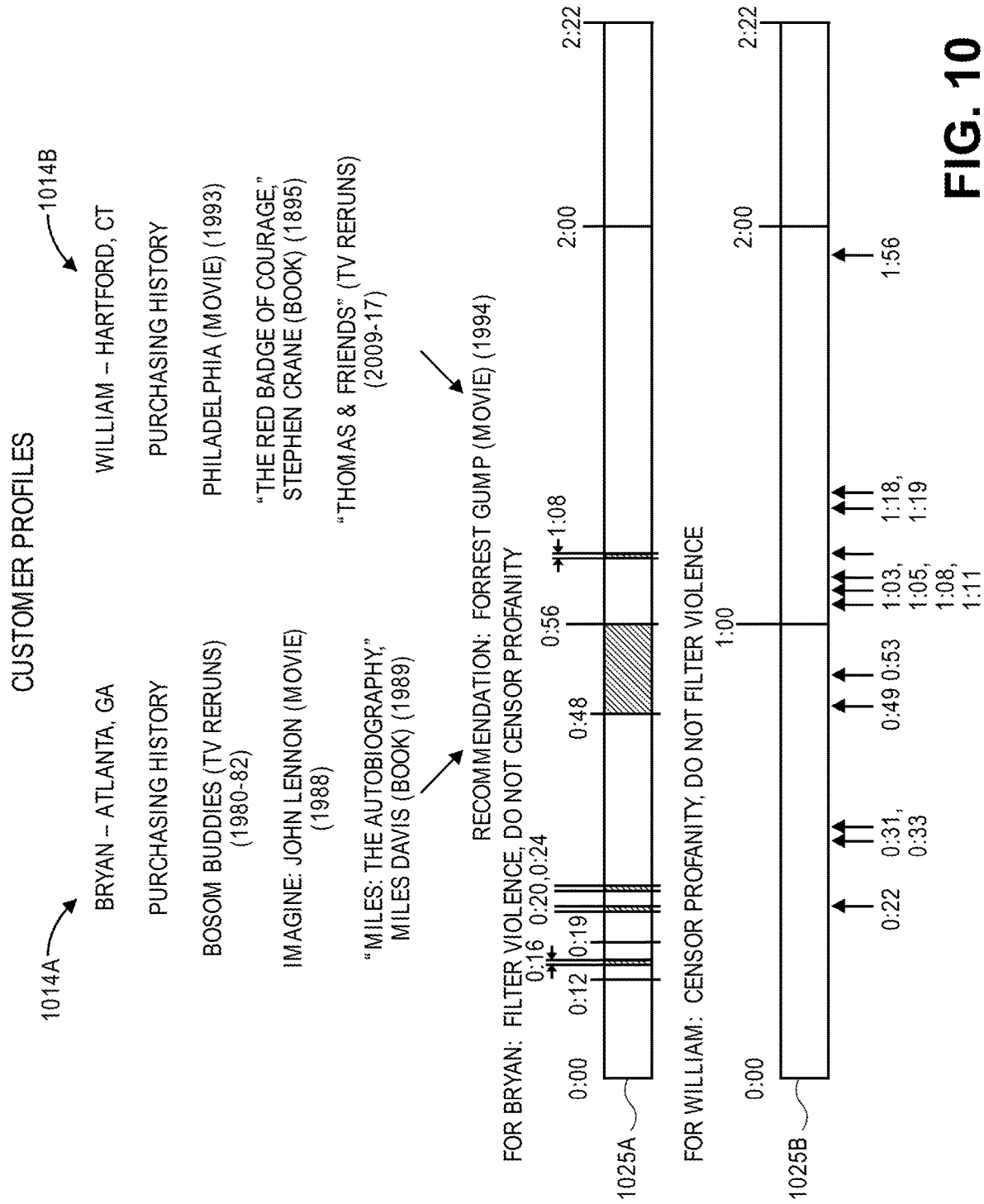
FIG. 10 is a view of aspects of one system for providing customized products based on customer behavior in accordance with embodiments of the present disclosure.

Additionally, in some embodiments, the systems and methods disclosed herein may be used to customize media files based on components (e.g., content) or attributes (e.g., styles or fits) that a customer is known to prefer or disfavor. Moreover, a customized product may be prepared in any manner, such as by modifying an existing product based on any components or attributes that are preferred or disfavored by the customer. In some embodiments, the same existing product may be customized in different ways for different customers, based on their respective component profiles. Referring to FIG. 10, a view of aspects of one system for providing customized products based on customer behavior in accordance with embodiments of the present disclosure is shown. Except where otherwise noted, reference numerals preceded by the number "10" in FIG. 10 refer to elements that are similar to elements having reference numerals preceded by the number "9" in FIG. 9A or FIG. 9B, by the number "8" in FIG. 8A, FIG. 8B or FIG. 8C, by the number "7" in FIG. 7, by the number "6" in FIG. 6, by the number "4" in FIG. 4A, FIG. 4B or FIG. 4C, by the number "2" in FIG. 2A or FIG. 2B or by the number "1" shown in FIGS. 1A through 1G.

As is shown in FIG. 10, a pair of component profiles 1014A, 1014B for two discrete customers are shown. The component profile 1014A features information regarding a purchase history of one of the customers, which includes purchases of reruns of "Bosom Buddies," a 1980s television series starring Tom Hanks, the 1988 movie "Imagine: John Lennon," and the 1989 book "Miles: The Autobiography," by Miles Davis. The component profile 1014B includes information regarding a purchase history of another of the customers, which includes purchases of the 1993 movie "Philadelphia," which starred Tom Hanks, as well as the 1895 Civil War novel "The Red Badge of Courage" by Stephen Crane, and reruns of "Thomas & Friends" from 2009 to 2017.

The purchase histories in the component profiles 1014A, 1014B each suggest that the 1994 movie "Forrest Gump" may be appropriately recommended to either of the customers, due to its content-based similarities (e.g., that the movie stars Tom Hanks) to the reruns listed in the component profile 1014A and the movie listed in the component profile 1014B. However, the purchase histories in the component profiles 1014A, 1014B also imply components or attributes that each of the respective customers prefers or disfavors. For example, the purchase of the movie "Imagine: John Lennon" listed in the component profile 1014A implies that the customer may be a pacifist, as the movie is a documentary of the life of John Lennon, a musician who was a well-known pacifist. The purchase of the book "Miles: The Autobiography" listed in the component profile 1014A implies that the customer is not opposed to art that features profanity, as the book is known to include several hundred examples of profanity throughout its text. Likewise, the purchase of the book "The Red Badge of Courage" listed in the component profile 1014B indicates that the customer is a war history buff, while the purchase of the reruns of "Thomas & Friends" listed in the component profile 1014B implies that the customer may have or regularly care for one or more small children.

Based on the contents of the respective component profiles 1014A, 1014B, the same product may be customized in two completely different manners. For example, as is discussed above, because the component profile 1014A implies an interest in pacifism and at least a tolerance for profanity, a customized movie 1025A may be filtered to remove images of or references to violence from the movie (e.g., portions sixteen minutes, twenty minutes, twenty-four minutes, or one hour and eight minutes into the movie, as well as a span from forty-eight to fifty-six minutes). Because the component profile 1014B implies an interest in war history and an aversion to profanity, however, a customized movie 1025B that includes the images of or references to violence that were filtered from the customized movie 1025A, but obscures or "bleeps out" instances of profanity from an audio track of the movie (portions at twenty-two minutes, thirty-one minutes, thirty-three minutes, forty-nine minutes, fifty-three minutes, one hour and three minutes, one hour and five minutes, one hour and eight minutes, one hour and eleven minutes, one hour and eighteen minutes, one hour and nineteen minutes, one hour and fifty-six minutes).

Accordingly, one or more embodiments of the present disclosure may generate a customized product from an existing product, based on information or data regarding the specific and individualized interests of a customer, which may be determined on any basis, including but not limited to, based on interactions with one or more computer devices by a customer. Currently, where a movie includes content that may be objectionable to some (e.g., a film that is rated "R," or restricted), a modified version of the movie that is acceptable to all or most audiences may be generated by removing or obscuring all potentially objectionable content therefrom, subject to a low standard (e.g., a modified film that would be rated "PG" or "G"). In accordance with some embodiments of the present disclosure, however, the movie that includes objectionable content may be modified based on the specific interests of an individual customer, namely, to exclude content that is known, determined or predicted to be objectionable to the customer, while retaining content that is known, determined or predicted to be unobjectionable to the customer, and marketed to the customer.

Figure 11:
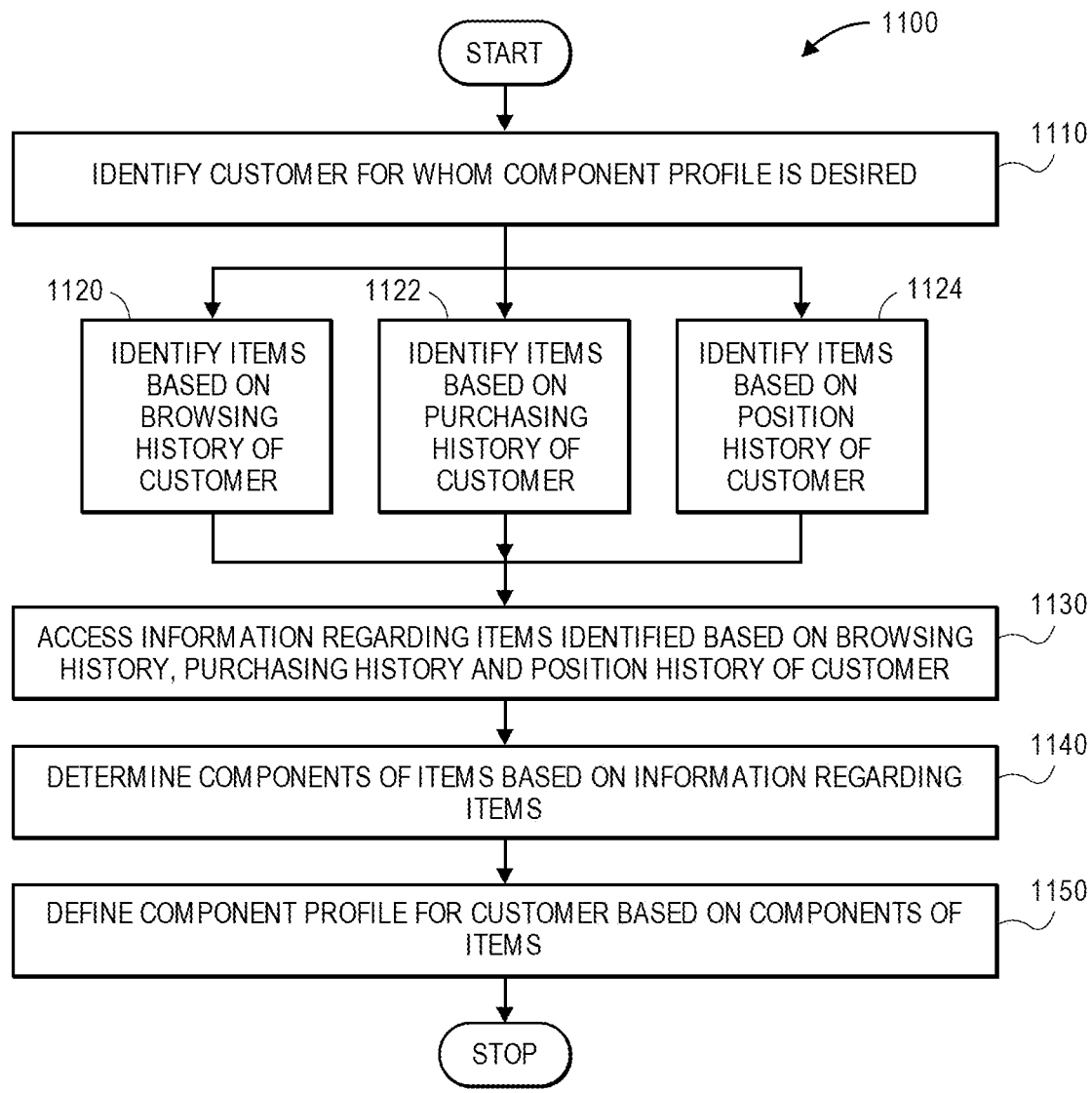
FIG. 11 is a flow chart of one process for providing customized products based on customer behavior in accordance with embodiments of the present disclosure.

In accordance with the present disclosure, any type or form of component profile (e.g., a gastronomic profile for food, a couture profile for clothing, or any other type or form of component profile) may be generated based on components or attributes of items that a customer is known, determined or predicted to prefer or dislike. Referring to FIG. 11, a flow chart 1100 of one process for preparing customized products based on customer behavior in accordance with embodiments of the present disclosure is shown. At box 1110, a customer for whom a component profile is desired is identified. The customer may be one of a group of customers, or a single customer selected for this purpose. In parallel, at box 1120, one or more items are identified based on the browsing history of the customer (e.g., one or more network sites or files accessed by the customer), while at box 1122, one or more items are identified based on the purchasing history of the customer (e.g., items that the customer has purchased or in which the customer is believed to be interested), and at box 1124, one or more items are identified based on the position history of the customer (e.g., where the customer has been). Such information may be obtained from one or more cache files, folders or other locations in a data store or other memory component of a computer device, as well as a list or record of URIs or URLs accessed, visited or viewed by a browser or another application, or coordinates or other records of positions of a computer device (e.g., a mobile device, such as a smartphone or tablet computer), or any other source.

At box 1130, information regarding the items identified based on the browsing history, the purchasing history and the position history of the customer is accessed, e.g., from one or more external resources. For example, where the browsing history includes a URL or cookies received from a network page describing or depicting an item, information regarding that item may be obtained from that network page, or from one or more other network pages (e.g., verified or unverified pages) regarding the item. Where the purchasing history indicates that the customer has purchased or considered purchasing one or more items, e.g., from an online marketplace, such information may include the dates or times when the customer purchased or considered purchasing the items, as well as numbers, masses or volumes of the items that were purchased or considered for purchase. Where the position history indicates that the customer has traveled to a specific city, theater or restaurant, information regarding items that are commonly associated with that city, with shows or events shown at that theater, or with foods that are sold at that restaurant may be identified. At box 1140, components of the items are identified based on the information determined at box 1130.

At box 1150, a component profile is defined for a customer based at least in part on the components of the items, and the process ends. For example, the component profile may include an indicator of whether the customer prefers or disfavors an item, as well as the customer's specific experience with that item. The component profile may also indicate amounts, masses or volumes of the item that are associated with the customer's level of interest (e.g., the customer may dislike beef or mushrooms in large portions or having chocolate milk with chicken but may tolerate beef or mushrooms in small portions or enjoy having chocolate milk with fish). The component profile may also include or identify any qualifiers associated with a customer's level of interest in a component, such as whether the customer dislikes Tom Clancy novels but prefers movies based on Tom Clancy novels, or whether the customer enjoys his or her pizza at hot or cold temperatures. Any information regarding a customer's level of interest in an item, to any level of granularity or precision, may be included in a component profile of the present disclosure.

Embodiments of the systems and methods disclosed herein may have any number of uses or applications in a wide variety of fields. For example, one or more of such embodiments may be utilized in connection with any service for leveraging customer behavior to automatically prepare any number of consumable products, processed foods, perishable foods, menus, snack foods, mixed beverages such as sodas or frozen entrées based on any information or data that may be known, determined or predicted regarding one or more customers or potential customers. Similarly, and outside of the context of food, one or more of such embodiments may be utilized to conceive or prepare customized products based on browsing histories, searching histories, purchasing histories, "clicks" or other selections, page views, queries for products or any other interactions with a computer device, e.g., an Internet-enabled computer device. Moreover, one or more of such embodiments may be used to conceive or prepare customized products in response to results of marketing campaigns (e.g., electronic campaigns, dynamic advertisements, impressions, online hits) or upon learning that a customer, or a group of customers, prefers or disfavors specific components or attributes of items on a medical, moral or social basis. For example, customized products may be conceived and prepared based on a customer's allergies, religion, dietary preferences or restrictions, or on any other basis.

Such embodiments may also be used to conceive and/or prepare any other customized goods of any type or form, including but not limited to fashion products (e.g., garments), health or household products (e.g., baby foods or toys), sporting goods, automotive goods or accessories, or even vehicles. Moreover, such embodiments may be further utilized to customize and/or prepare packaging for any item, for example, to include "eco-friendly" packaging, watertight packaging, high-impact resistant packaging, or packaging having any specific components or attributes (e.g., polystyrene, polypropylene, cardboard, paperboard, fibers, aluminum).

Although some embodiments of the present disclosure describe the conception of one or more customized food products or articles of clothing, and the generation of instructions for preparing the food products or the articles of clothing, those of ordinary skill in the pertinent arts will realize that the systems and methods of the present disclosure are limited to food or clothing. Rather, the systems and methods of the present disclosure may be utilized in connection with any goods or services, which may be customized based on any information or data that may be known, determined or predicted regarding preferences of a customer. Furthermore, although the present disclosure references a number of profiles, including customer profiles, component profiles, gastronomic profiles, couture profiles, clothing profiles, style profiles, machine profiles or the like, each of the "profiles" referenced herein may include information or data regarding either components or attributes, or components and attributes, that are preferred by a customer, or are disfavored by a customer. The capacities of any of the profiles disclosed herein to receive and store information or data regarding any such component, or any such attribute, that may e preferred by a customer or disfavored by a customer are not limited.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 5 or 11, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
   a computer server connected to a network,
   wherein the computer server is configured to at least:
      determine that a first customer is interested in at least one garment in a category of garments at a first time;
      in response to determining that the first customer is interested in the at least one garment in the category of garments,
         identify a first garment in the category, wherein the first garment is available for purchase from an electronic marketplace at the first time, and wherein the first garment is formed from a first combination of at least a first component and a second component;
         determine that the first customer prefers a third component over the second component based at least in part on one or more of:
            a network page previously viewed by the first customer;
            a product previously purchased by the first customer; or
            a location previously visited by the first customer;
         automatically generate a procedure for preparing a second garment in the category at a second time, wherein the procedure comprises a plurality of steps, wherein a first step of the plurality of steps requires forming a second combination of at least the first component and the third component, wherein the second time follows the first time, and wherein the second garment is not available for purchase from the electronic marketplace prior to the second time;
         cause a display of a first network page comprising information regarding the second garment to the first customer, wherein the first network page is associated with the electronic marketplace;
         receive an order for a purchase of the second garment by the first customer from the electronic marketplace via the first network page;
         cause the second garment to be prepared according to the procedure; and
         cause the second garment to be delivered to the first customer,
      wherein the first component is one of a first fiber, a first yarn, a first thread, a first fabric, a first pattern, a first style, a first embellishment, a first treatment or a first dye,
      wherein the second component is one of a second fiber, a second yarn, a second thread, a second fabric, a second pattern, a second style, a second embellishment, a second treatment or a second dye, and
      wherein the third component is one of a third fiber, a third yarn, a third thread, a third fabric, a third pattern, a third style, a third embellishment, a third treatment or a third dye.

2. The system of claim 1, wherein the computer server is further configured to at least:
   prior to the first time,
      determine that the first customer previously purchased a plurality of garments;
      identify components of each of the plurality of garments, wherein the third component is one of the components;

aggregate the components of each of the plurality of garments; and
generate a couture profile of the first customer based at least in part on:
one or more of numbers, amounts, masses or volumes of the aggregated components; and
one or more of:
the network page;
the product; or
the location,
wherein that the first customer prefers the third component over the second component is determined based at least in part on the couture profile of the first customer.

3. The system of claim 2, wherein the computer server is further configured to at least:
receive one or more of:
a keyword corresponding to the at least one garment; or
a selection of the category from a computer device associated with the first customer; and
access at least one file stored in association with the computer device, wherein the at least one file comprises the couture profile of the first customer.

4. The system of claim 1, wherein the computer server is further configured to at least:
determine that a second customer is interested in at least one garment in the category of garments;
determine that the second customer prefers a fourth component to the second component based at least in part on one or more of:
a network page previously viewed by the second customer;
a product previously purchased by the second customer; or
a location previously visited by the second customer;
generate a third procedure for preparing a third garment in the category, wherein the third procedure comprises a third plurality of steps, wherein a first step of the third plurality of steps comprises forming a third combination of at least the first component and the fourth component;
cause a display of a second network page comprising information regarding the third garment to the second customer;
receive an order for the third garment from the second customer via the second network page;
cause the third garment to be prepared according to the third procedure; and
cause the third garment to be delivered to the second customer.

5. A computer-implemented method comprising:
receiving, by a server over a network, a request for information regarding at least a first article of clothing from a first computer device of a first customer at a first time, wherein the first article of clothing is associated with a category of articles of clothing, and wherein the first article of clothing comprises at least a first component;
identifying, by the server, a component profile of the first customer, wherein the component profile comprises information regarding an association of each of a plurality of components with the first customer, wherein each of the plurality of components is a component of one or more of:
a product shown on at least one page of at least one network site accessed by the first computer device;
a product previously purchased by the first customer; or
a product previously used by the first customer;
automatically determining, by the server, an association of a second component with the first customer based at least in part on the component profile and at least one component of one of the first article of clothing or the first customer, wherein the second component is one of the plurality of components, and wherein the second component is one or more of a fiber, a yarn, a thread, a fabric, a pattern, a style, an embellishment, a treatment or a dye;
automatically generating, by the server, a procedure for preparing a second article of clothing at a second time based at least in part on the association of the second component with the first customer, wherein the procedure comprises a set of actions involving at least the second component, wherein the second article of clothing is in the category of articles of clothing, and wherein the second time follows the first time; and
transmitting, by the server over the network, information regarding the second article of clothing to one or more of the first computer device or a second computer device associated with one or more of a manufacturer, a vendor or a merchant of the second article of clothing.

6. The computer-implemented method of claim 5, wherein the server is associated with an electronic marketplace,
wherein the first article of clothing is available for purchase via the electronic marketplace at the first time, and
wherein the second article of clothing is not available for purchase via the electronic marketplace prior to the second time.

7. The computer-implemented method of claim 5, wherein the second component is one of:
a substitute for the first component; or
a complement to the first component.

8. The computer-implemented method of claim 5, further comprising:
determining information regarding at least one interaction by the first customer with at least the first computer device;
identifying, by the server, at least a third article of clothing associated with the at least one interaction;
identifying, by the server, at least one component of the third article of clothing, wherein the at least one component is one or more of a fiber, a yarn, a thread, a fabric, a pattern, a style, an embellishment, a treatment or a dye associated with the third article of clothing;
determining, by the server, an association of the at least one component of the third article of clothing with the first customer; and
storing information regarding the association of the at least one component of the third article of clothing with the first customer in the component profile.

9. The computer-implemented method of claim 8, wherein determining the information regarding the at least one interaction by the first customer with at least the first computer device comprises one or more of:
determining that the at least one network site was accessed by the first computer device prior to the first time;
identifying the product previously purchased by the first customer, wherein the product was previously purchased by the first customer using the first computer device prior to the first time;

identifying the product previously used by the first customer, wherein the product was previously used by the first customer prior to the first time;

determining at least one position of the first computer device prior to the first time; or identifying at least one image captured by the first computer device prior to the first time, wherein the third article of clothing is identified based at least in part on the at least one network site, the product previously purchased, the product previously used, the at least one position or the at least one image.

10. The computer-implemented method of claim 5, wherein the component profile comprises one or more of:

a cut of at least a portion of a third article of clothing previously purchased by the first customer;

a country of origin of at least the portion of the third article of clothing;

a dimension of at least the portion of the third article of clothing;

a stitch of at least the portion of the third article of clothing;

a style of at least the portion of the third article of clothing;

a texture of at least the portion of the third article of clothing;

a thread count of at least the portion of the third article of clothing;

a treatment of at least the portion of the third article of clothing; or a weave of at least the portion of the third article of clothing.

11. The computer-implemented method of claim 5, further comprising:

identifying, by the server, a plurality of articles of clothing previously purchased or consumed by the customer;

determining, by the server, at least one component of each of the plurality of articles of clothing;

generating, by the server, at least one cluster of the components of the plurality of articles of clothing according to at least one machine learning tool; and selecting, by the server, the second component based at least in part on the at least one cluster.

12. The computer-implemented method of claim 5, wherein the first article of clothing is prepared according to a procedure comprising a first action and a second action, and wherein automatically generating the procedure for preparing the second article of clothing comprises:

automatically modifying the first action by the server; and defining, by the server, the procedure for preparing the second article of clothing to include at least the automatically modified first action and the second action.

13. The computer-implemented method of claim 12, wherein the first action comprises at least one of a sewing, a stitching or a folding of the first component, and wherein the automatically modified first action comprises at least one of a sewing, a stitching or a folding of the second component.

14. The computer-implemented method of claim 12, wherein the first action requires at least a first stitch of the first component to a third component, and wherein the automatically modified first action requires at least a second stitch of the second component to the third component.

15. The computer-implemented method of claim 5, further comprising:

transmitting, by the server over the network, code for causing a display of at least a first network page of a marketplace site to the first computer device, wherein the request for information is received via the first network page, and wherein transmitting the information regarding the second article of clothing to the at least one of the first computer device or the second computer device comprises:

transmitting, by the server over the network, code for causing a display of at least a second network page of the marketplace site to the first computer device, wherein the second network page comprises at least one of:

the information regarding the second article of clothing; or information regarding at least one of the second component or the procedure.

16. The computer-implemented method of claim 5, wherein transmitting the information regarding the second article of clothing to the first computer device comprises:

transmitting, by the server over the network, an electronic message to the first computer device, wherein the electronic message comprises:

the information regarding the second article of clothing; and information regarding at least one of the second component or the procedure.

17. The computer-implemented method of claim 5, further comprising:

causing the second article of clothing to be prepared according to the procedure, wherein the information regarding the second article of clothing transmitted to the first computer device comprises at least one of:

an indication that the second article of clothing has been prepared according to the procedure; or an offer to purchase the second article of clothing.

18. The computer-implemented method of claim 5, wherein automatically determining the association of the second component with the first customer comprises:

determining, by the server, at least one of:

that the first customer has an aversion to the first component based at least in part on the component profile of the first customer; or that the customer has a preference for the second component based at least in part on the component profile of the first customer, and wherein the procedure for preparing the second article of clothing is automatically generated based at least in part on at least one of:

the aversion to the first component; or the preference for the second component.

19. A computer-implemented method comprising:

accessing, by a server associated with an electronic marketplace, a purchasing history of a customer, wherein the purchase history includes identifiers of each of a plurality of garments previously purchased by the customer over a period of time;

determining, by the server, components of the plurality of garments based at least in part on the identifiers, wherein the components comprise one or more of a fabric, a material, a stitch or a fastener of each of the plurality of garments;

aggregating, by the server, the components of the plurality of garments; and generating, by the server, a component profile for the customer based at least in part on the aggregated components;

receiving, by the server over a network, a keyword corresponding to at least one of a category of garments from the customer, wherein the keyword is received via a user interface displayed on a mobile device associated with the customer at a first time, and wherein the first time follows the period of time;

identifying one of the garments in the category of garments, wherein the one of the garments is available for purchase from the electronic marketplace at the first time, and wherein the one of the garments comprises at least a first component and a second component;

determining that the customer has one of an aversion to the second component or a preference for a third component based at least in part on the component profile;

automatically generating a procedure for preparing a customized garment in the category of garments at a second time, wherein the modified procedure comprises combining at least the first component and the third component, and wherein the second time follows the first time; and causing a display of a page including information regarding at least one of the customized garment or the procedure on the user interface, wherein the one of the garments is available for purchase from the electronic marketplace at the first time, and wherein the customized garment is not available for purchase prior to the second time.

20. The computer-implemented method of claim 19, wherein determining that the customer has the one of the aversion to the second component or the preference for the third component comprises at least one of:

determining that a size, a weight, a density, a thickness or a thread count of the second component is below a threshold associated with the customer; or determining that a size, a weight, a density, a thickness or a thread count of the third component exceeds the threshold associated with the customer.

\* \* \* \* \*